United States Patent
Rieger

(10) Patent No.: US 11,367,133 B2
(45) Date of Patent: *Jun. 21, 2022

(54) SYSTEM AND METHOD FOR DETERMINING INTEREST RATES AND INTEREST RATE BUY DOWN FOR INDIRECT FINANCING TRANSACTIONS

(71) Applicant: Finx Software Technology Inc., Vancouver (CA)

(72) Inventor: Raymond Keith Rieger, Vancouver (CA)

(73) Assignee: Finx Software Technolgy Inc., Vancouver (CA)

( * ) Notice: Subject to any disclaimer, the term of this patent is extended or adjusted under 35 U.S.C. 154(b) by 19 days.

This patent is subject to a terminal disclaimer.

(21) Appl. No.: 16/856,957

(22) Filed: Apr. 23, 2020

(65) Prior Publication Data

US 2020/0250748 A1 Aug. 6, 2020

Related U.S. Application Data

(63) Continuation-in-part of application No. 15/057,570, filed on Mar. 1, 2016, now Pat. No. 10,664,907.

(51) Int. Cl.
*G06Q 40/00* (2012.01)
*G06Q 40/02* (2012.01)
(Continued)

(52) U.S. Cl.
CPC ....... *G06Q 40/025* (2013.01); *G06F 3/04847* (2013.01); *G06F 3/1438* (2013.01); *G06Q 30/012* (2013.01); *G06Q 30/06* (2013.01)

(58) Field of Classification Search
CPC .... G06Q 40/025; G06Q 30/012; G06Q 30/06; G06F 3/04847; G06F 3/1438
See application file for complete search history.

(56) References Cited

U.S. PATENT DOCUMENTS 5,774,883 A 6/1998 Andersen et al.
6,671,677 B2 12/2003 May
(Continued)

FOREIGN PATENT DOCUMENTS

JP 2010514068 A 4/2010
WO WO-2004061748 A1 * 7/2004 ............. G06Q 30/06

OTHER PUBLICATIONS

Anonymous, "Buying Down the APR,"streetsmartauto.com, 2013 (Year: 2013).*
(Continued)

*Primary Examiner* — Alexander G Kalinowski
*Assistant Examiner* — William B. Bunker
(74) *Attorney, Agent, or Firm* — McCarthy Tétrault LLP

(57) ABSTRACT

Systems and methods are provided for enabling a dealer to configure a plurality of financing plans for a vehicle purchase by a buyer. A first interest rate is determined for a first financing plan for the purchase without any products. A selection of products to be purchased is accepted and the expected profits from their sale is determined, and a second interest rate for a second financing plan for the vehicle purchase with the products is determined, wherein the second interest rate is lower than the first interest rate. The system accepts a profit setting representing a portion of the expected profits that can be applied to lower the interest rate and facilitate the second financing plan for the purchase with the second interest rate.

14 Claims, 23 Drawing Sheets

(51) Int. Cl.
*G06F 3/14* (2006.01)
*G06F 3/04847* (2022.01)
*G06Q 30/00* (2012.01)
*G06Q 30/06* (2012.01)

(56) References Cited

U.S. PATENT DOCUMENTS

| | | | |
|---|---|---|---|
| 8,396,761 B2 | 3/2013 | Peter | |
| 8,660,943 B1* | 2/2014 | Chirehdast | G06Q 40/00 |
| | | | 705/38 |
| 10,096,042 B2 | 10/2018 | Poole et al. | |
| 10,304,083 B2 | 5/2019 | Poole et al. | |
| 10,664,721 B1* | 5/2020 | Price | G06F 3/04847 |
| 2003/0126072 A1 | 7/2003 | Brock | |
| 2004/0133456 A1* | 7/2004 | Nagelvoort | G06Q 50/188 |
| | | | 705/4 |
| 2005/0021453 A1* | 1/2005 | Lyman | G06Q 40/02 |
| | | | 705/38 |
| 2008/0015954 A1 | 1/2008 | Huber et al. | |
| 2008/0154737 A1* | 6/2008 | Linkswiler | G06Q 30/02 |
| | | | 705/14.37 |
| 2008/0154791 A1 | 6/2008 | Bannister et al. | |
| 2008/0183616 A1* | 7/2008 | Hankey | G06Q 40/00 |
| | | | 705/38 |
| 2008/0183633 A1* | 7/2008 | Nagelvoort | G06Q 10/0637 |
| | | | 705/35 |
| 2009/0043690 A1 | 2/2009 | MacLellan et al. | |
| 2010/0042491 A1* | 2/2010 | Halleck | G06Q 30/0224 |
| | | | 235/493 |
| 2011/0276467 A1* | 11/2011 | Blackburn | G06Q 40/025 |
| | | | 705/38 |
| 2013/0268315 A1 | 10/2013 | Cotton et al. | |
| 2015/0058257 A1 | 2/2015 | Stiff et al. | |
| 2016/0110804 A1* | 4/2016 | Cotton | G06Q 40/025 |
| | | | 705/38 |
| 2017/0178245 A1* | 6/2017 | Rodkey | G06F 16/00 |
| 2017/0255994 A1* | 9/2017 | Rieger | G06Q 40/025 |
| 2019/0244246 A1 | 8/2019 | Poole et al. | |
| 2020/0249966 A1* | 8/2020 | Smith | G06F 16/2291 |

OTHER PUBLICATIONS

Tim Esterdahl, "Is It Wise to Finance Vehicle Accessories When Buying a New Truck?", tundraheadquarters.com, 2014 (Year: 2014).*
"Buying Down the APR", http://streetsmartauto.com, Dec. 8, 2013, 2 pages, retrieved on Mar. 23, 2019, retrieved from https://web.archive.org/web/20131208053104/http://streetsmartauto.com/APRBuydown.html.
Jeff Trevarthen, "The Seller Buy Down Strategy: A Clever Financing Trick That Nobody Uses", https://www.biggerpockets.com/blog/2015/03/24/seller-buy-strategyclever-financing-trick/, Mar. 24, 2015, 9 pages.
Tim Esterdahl, "Is It Wise To Finance Vehicle Accessories When Buying A New Truck?", https://tundraheadquarters.com/finance-vehicle-accessories/, Apr. 1, 2014, 7 pages.

* cited by examiner

OPTION 1

Bank _____ rbc _____

Term _____ 60 months _____

Rate _____ 7.99% _____

Payment _____ $216 _____

Cost of borrowing _____ $4,871 _____

OPTION 2 — 117, 117A

Bank _____ rbc _____

Term _____ 72 months _____

Rate _____ 3.99% _____

Payment _____ $207 _____

• *Pocketbook Protection*

Warranty / Keyfob / Tire and Rim

+

Rate _____ 3.99% _____

Payment _____ $235 _____

• *Car Protection Kit*

3M / Chemical

+

Rate _____ 3.99% _____

Payment _____ $235 _____

• *Family Protection*

Life 72 / Disability 72

FIG. 4C

OPTION 1 — 117, 117B

Bank _____ rbc _____

Term _____ 48 months _____

Rate _____ 7.99% _____

Payment _____ $261 _____

Cost of borrowing _____ $3,857 _____

OPTION 2

Bank _____ rbc _____

Term _____ 72 months _____

Rate _____ 5.99% _____

Payment _____ $207 _____

• *Pocketbook Protection*

Warranty

SYSTEM AND METHOD FOR DETERMINING INTEREST RATES AND INTEREST RATE BUY DOWN FOR INDIRECT FINANCING TRANSACTIONS

REFERENCE TO RELATED APPLICATION

This application is a continuation-in-part, and claims the benefit under 35 U.S.C. § 120, of U.S. application Ser. No. 15/057,570 filed on Mar. 1, 2016 and entitled SYSTEM AND METHOD FOR DETERMINING INTEREST RATES AND INTEREST RATE BUY DOWN FOR INDIRECT FINANCING TRANSACTIONS, which is hereby incorporated herein by reference for all purposes.

TECHNICAL FIELD

This invention relates to systems and computer-implemented methods for facilitating indirect financing transactions.

BACKGROUND

A car dealer may arrange indirect financing for a customer to purchase a vehicle. Typically the financing is provided by a third party such as a financial institution or other lender. The dealer acts as the financial intermediary to facilitate the loan transaction. Based on the details of the vehicle sales transaction, the dealer calculates the size of the loan required. The dealer relays this information, along with other information from the customer needed to apply for the loan, to a financial institution. If the financial institution approves the loan, the dealer returns to the customer with the particular terms of the loan including the interest rate, term, and the payment schedule. For the interest rate, the dealer can select between one of several interest rates offered by the bank. The financial institution may offer compensation to the dealer in return for facilitating the loan from the financial institution. Such compensation may be referred to as "dealer reserve" and may vary according to the interest rate selected for the loan, among other variables. For example, an increased amount of compensation may be provided by the financial institution to the dealer for facilitating a loan transaction involving a higher interest rate.

In some cases there may be an option to buy down the interest rate to a lower interest rate. For example, where the customer purchases products as part of the vehicle sales transaction, the dealer may have additional profits from the transaction (that are in addition to the dealer reserve) to buy down the interest rate. Such products may include, for example aftermarket products such as extended warranties, tire and rim protection, key fob protection, vehicle armour protection, paint protection, life and disability insurance, and the like. The dealer may be able to incentivize the customer to purchase one or more of these additional products by offering to lower the interest rate for the customer (also referred to as "buying down" the interest rate). For example, the dealer may sell additional products to the customer and use some of the profits from the transaction to reduce the interest rate for the loan. The dealer benefits from the transaction by selling both the vehicle and one or more products, and the customer benefits by being able to procure additional product(s) with financing at a lower interest rate.

Conventional methods of assessing and determining the terms of a financing transaction typically involve the dealer manually calculating the financing terms using pen and paper and/or a calculator. Such methods are cumbersome and time-consuming. In addition, if the customer requests a change to the transaction (e.g. the customer wants to add or remove a product), the dealer must manually recalculate the terms of the transaction. Given that this is a laborious process, and the dealer is typically operating under time constraints to negotiate a sale during a meeting with the customer, the customer may be provided with no or limited comparative financing options. The customer may not be interested in the particular option that is presented to him by the dealer. As a result, the dealer may lose out on the opportunity to complete the transaction or sell the customer additional products. Because of the extent of the required calculations, conventional methods may also be prone to human error, potentially leading to a loss in profits for the dealer.

In addition, because the calculated loan payment amounts for each interest rate depend on so many variables, and because the dealer is operating under the aforementioned time constraints in negotiating a sale, it can be generally difficult for the dealer to evaluate which interest rate should be selected for the customer and to evaluate to what extent the dealer may be able to buy down the interest rate if the customer selects certain products to add to the transaction. In many cases the dealer simply must "eye-ball" the interest rates and determine generally, based on information that the dealer has in relation to the transaction (such as the customer's desired loan payment range and other variables), which interest rate the dealer should select as the starting interest rate. However, this technique may result in a less than optimal transaction for one or both of the parties, given that it relies to a certain extent on guesswork. As a result, the full range of options may not be evaluated. There is a desire to address these and other issues when arranging and negotiating the terms of an indirect financing transaction with a customer.

The foregoing examples of the related art and limitations related thereto are intended to be illustrative and not exclusive. Other limitations of the related art will become apparent to those of skill in the art upon a reading of the specification and a study of the drawings.

SUMMARY

One aspect of the invention provides a system for enabling a dealer to configure a plurality of financing plans for a vehicle purchase by a buyer. The system includes a transaction server having a computer processor configured to determine a first interest rate for a first financing plan for the purchase without any products; accept a selection of one or more products to be purchased with the vehicle; determine the profits expected from the sale of the selected one or more products; determine a second interest rate for a second financing plan for the purchase with the selected one or more products wherein the second interest rate is lower than the first interest rate, and accept a profit setting representing a portion of the expected profits that can be applied to lower the interest rate and facilitate the second financing plan for the purchase with the second interest rate.

In some embodiments, the transaction server is configured to output the financing plans to the dealer for display in a first display window and output the financing plans to the buyer for display in a second display window, wherein the first display window provides a first set of user interface controls through which the dealer can select the profit setting representing a portion of the expected profits to buy down the interest rate, and wherein both the first display window and the second display window provide a second set of user interface controls enabling the selection of the one or more products. The one or more products may include one or more of warranty protection, car protection, family protection, and a service contract. The service contract may include the sale of buy down points wherein a purchase of each buy down point lowers the interest rate to the next lower interest rate within a loan program. For each buy down point, the system determines a dealer cost of the buy down point based on a total amount to be financed for the purchase, and a dealer reserve from the total amount to be financed.

In certain embodiments, the transaction server is configured to cause to be displayed in the first display window a variable profit setting which enables the dealer to set a minimum profit to be retained from the purchase and applies a remainder of the profit to facilitate the second financing plan with the second interest rate. The variable profit setting may be represented in the first display window as one or more of a dollar amount and a percentage of the profit. A value for the variable profit setting may be selected by the dealer using a graphical control element in the first display window. In some embodiments, the graphical control element includes a slider constrained to accept only values for the variable profit setting not exceeding a maximum profit from the purchase.

According to a particular embodiment, a plurality of graphical control elements is displayed in the first display window, each one of the plurality of graphical control elements corresponding to a variable profit setting for a category of products and enabling the dealer to set a minimum profit to be retained from purchasing the products in that category.

A further aspect of the invention provides for a method for enabling a dealer to configure a plurality of financing plans for a vehicle purchase by a buyer. The method includes determining a first interest rate for a first financing plan for the purchase without any products; accepting a selection of one or more products to be purchased with the vehicle; determining the profits expected from the sale of the selected one or more products; determining a second interest rate for a second financing plan for the purchase with the one or more products wherein the second interest rate is lower than the first interest rate, and accepting a profit setting representing a portion of the expected profits that can be applied to lower the interest rate and facilitate the second financing plan for the purchase with the second interest rate In addition to the exemplary aspects and embodiments described above, further aspects and embodiments will become apparent by reference to the drawings and by study of the following detailed descriptions.

BRIEF DESCRIPTION OF DRAWINGS

Exemplary embodiments are illustrated in referenced figures of the drawings. It is intended that the embodiments and figures disclosed herein are to be considered illustrative rather than restrictive.

FIG. 3 illustrates an exemplary worksheet for entering loan parameters.

FIGS. 4A and 4B illustrate exemplary options sheets for accepting a selection of products associated with each financing plan and displaying the details of each financing plan.

FIGS. 4C and 4D illustrate an alternate way of displaying the details of financing plans shown in FIGS. 4A and 4B.

FIG. 5 illustrates an exemplary product list.

FIGS. 7A and 7B illustrate the options sheets for the plan of FIG. 4A, wherein an interest rate buy down has been activated in the FIGS. 7A and 7B options sheets.

FIG. 9 illustrates a product sheet that can be used by a dealer to configure various options for products purchased with a vehicle.

DESCRIPTION

Throughout the following description, specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

Embodiments of the invention provide computer-implemented tools to facilitate the sale of a vehicle to a customer involving an indirect financing transaction. As used herein, "vehicle" includes any machine for transport of people or goods that may be purchased by a consumer, and includes, without limitation, automobiles, motorcycles, bicycles, all-terrain vehicles, snowmobiles, scooters, and the like, or any other type of vehicle that may be sold by an automotive dealer. Particular embodiments provide systems and methods for determining the particulars of various financing arrangements based on loan parameters and product selection, receiving modifications to loan parameters or product selection, and determining updated particulars of the financing arrangements based on the modifications received. The systems and methods evaluate different financing arrangements and determine interest rates, interest rate buy down, and the financing terms for each arrangement. Particular systems and methods described herein provide for generating multiple financing plans each with different product selections and financing terms such as interest rate, term and payment schedule. These different financing plans are displayed to the customer so that the customer may evaluate his options and choose his desired plan from one of the options. In addition, if any modifications are made to the loan parameters or product selection, or if an interest rate buy down is activated by the dealer (using for example at least a portion of the expected profits from the sale of products in the transaction to buy down the interest rate for the customer), then the system recalculates the financing plans and outputs updated financing plans taking into account the modified loan data.

Figure 1:
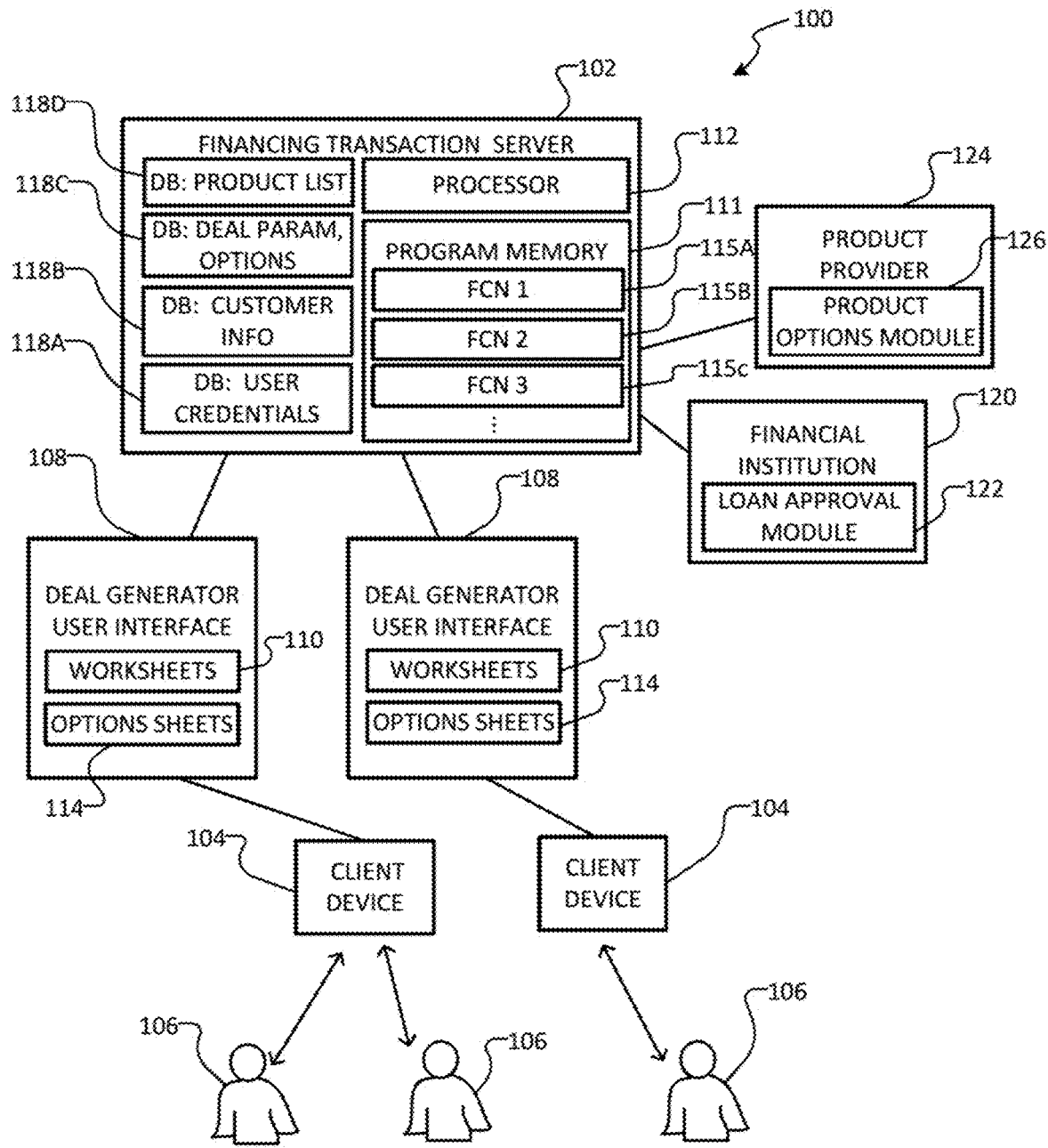
FIG. 1 illustrates a system according to one embodiment for facilitating the sale of a vehicle with an indirect financing transaction.

FIG. 1 illustrates a system 100 for facilitating the sale of a vehicle with an indirect financing transaction. System 100 includes a financing transaction server 102. Transaction server 102 may be a computer which receives requests from a client device 104 for the generation of financing plans, coordinates the determination of the financing plans based on particulars provided by the client device 104, and communicates the financing plans to the client device 104. As shown in FIG. 1, server 102 is in communication with one or more client devices 104 through a user interface 108 displayable on each client device 104. Each client device 104 may be operated by a user 106 of the system 102. User 106 may be a dealer, such as an auto dealer, finance officer, broker, lender or the like ("dealer", as used herein, includes any of the foregoing persons, including those operating at a vehicle dealership or a broker of loans and products). Client device 104 may comprise a laptop, desktop computer, smartphone, tablet or other mobile device, or any other suitable device capable of communicating over a wired or wireless connection with transaction server 102.

Client device 104 runs an application (such as a web browser application or a custom-built application installed on client device 104) which can provide a user interface 108 for use by user 106 to communicate information and instructions to transaction server 102. For example, when meeting with a customer, user 106 may input customer data, product selection, loan parameters and other information into one or more worksheets 110 displayed to the user 106 through user interface 108. Server 102 facilitates the financing transaction by receiving and processing information and instructions from client device 104, relaying loan application details to one or more servers 120 of a financial institution or other lender (which may each comprise a loan approval module 122 operable to determine whether or not to approve the loan based on the information provided), processing any information returned from the financial institution servers 120 in respect of the loan request, and returning to the client device 104 available financing options which are within certain loan parameters. The financing options may be displayed on options sheets 114 viewable in user interface 108.

As seen in FIG. 1, transaction server 102 includes a processor 112, and a program memory 111 which stores a number of software functions 115A, 115B, 115C, etc. (collectively, software functions 115). When executed by processor 112, software functions 115 implement methods in accordance with the embodiments described herein. Transaction server 102 may also include memory or storage for one or more databases 118 (or alternately, one or more of such databases 118 may be stored elsewhere and are accessible to transaction server 102). Databases 118 store information needed to administer, manage and maintain the financing transaction system 100 and determine the available financing options to be returned to client device 104. For example, databases 118 may include: a user credentials database 118A containing the account names and passwords of the users who are authorized to access the system 100 via deal generator interface 108; a customer database 118B containing the names, contact information, customer preferences, etc. for customers of each user 106 authorized to access the system 100; a deal parameter and options database 118C containing the parameters for each saved transaction or deal worksheet (e.g. interest rate, term, payment schedule, loan payment amount, products selected, etc.) associated with each customer; and a product list database 118D containing a list of the products available for resale to a customer of the user 106 and their associated costs (e.g. dealer cost and suggested retail price). Non-limiting examples of such products include: aftermarket products such as extended warranties, tire and rim protection, key fob protection, vehicle armour protection, paint protection, life insurance, disability insurance; products such as accessories for the vehicle; and service contracts (as explained in further detail below) and the like. As used herein, "products" includes any of the foregoing products, including those that may be considered in some contexts to be the provision of a "service", such as the sale of a service contract, whether it includes buy down points, prepaid maintenance, or administration fees.

In some embodiments, users 106 of the system 102 are able to modify and/or input data in one or more of the databases 118 through user interface 108. For example, a user 106 may employ user interface 108 to modify the product list in database 118D and customer information in database 118B.

In particular embodiments, information concerning products that may be purchased by the customer as part of the transaction is obtained from a product provider 124 (see FIG. 1). Product provider 124 may comprise a server which provides a product options module 126 that delivers information to financing transaction server 102 regarding products such as, for example, the provider of the product, name of the product, dealer cost and suggested retail price. Such information may optionally be saved to product list database 118D stored on or accessible to financing transaction server 102.

Representative categories of products include the following:

(i) Warranty protection—providing insurance against out-of-pocket expenses that may need to be incurred to keep the vehicle in operation. Warranty protection plans may include, for example, extended warranty, tire and rim protection, key fob protection, and the like.

(ii) Car protection—providing insurance against out-of-pocket expenses that may need to be incurred to maintain the aesthetic appearance of the vehicle. Car protection plans may include, for example, chemical protection and paint protection.

(iii) Family protection—providing insurance against events, such as disability or death, that may make it difficult or impossible for the customer to pay the loan payment amounts. Family protection plans may include, for example, disability insurance and life insurance.

(iv) Service contracts—the purchase of a service contract will decrease the interest rate for the customer. The service contract may be a contract to provide a loan at a lower interest rate than the initial rate, through the sale of "buy down points" to the customer to recapture at least some of the lost dealer reserve when facilitating the transaction at the lower interest rate. Other forms of service contracts include prepaid maintenance contracts and the like. Some service contracts may involve the charging of administration fees to the customers. In certain embodiments, the dealer can elect to share with the customer some of the dealer's profits from the service contract to finance the transaction at a lower interest rate.

The foregoing is not intended to be an exhaustive list of products that can be sold to the customer as part of the vehicle transaction. As noted above, products that can be sold as part of the vehicle transaction, and therefore included in the total amount to finance, may include other products such as other aftermarket products, vehicle accessories, and other service contracts.

Particular categories of products may generate higher profits for the dealer. For example, the purchase of an extended warranty may yield a significant profit. Other categories of products may yield relatively fewer profits (such as for example, key fob and tire and rim protection). As explained in further detail below, the financing transaction server 102 may set the starting interest rate for a particular transaction based on the profits to be made by the resale of the product options to the dealer's customer. Profits below a first configurable threshold level may result in the highest of the available interest rates being set as the starting interest rate, while profits below a second configurable threshold level that is higher than the first configurable threshold level may result in the second highest of the available interest rates being set as the starting interest rate, and so on (i.e. the interest rate is dropped to the next level each time the expected total profits exceeds the next configurable threshold level). As explained in more detail below, at the option of the user 106, such starting interest rates may be adjusted by financing transaction server 102, to incentivize the customer to purchase products. This may be accomplished by applying at least some of the dealer's profits from the transaction to buy down the starting interest rate.

While only one representative financial institution server 120 and one representative product provider server 124 is shown in FIG. 1, in particular embodiments more than one of servers 120, 124 may be in communication with financing transaction server 102. For example, each of a plurality of financial institutions may have a server 120 that has a loan approval module 122 operable to approve a loan application from financing transaction server 102 for a customer. In addition, there may be a plurality of different product providers (each of which may offer different categories of products), each one of which comprises a server 124 that relays information regarding its product options to financing transaction server 102. Financing transaction server 102 may compile the information received from servers 120, 124 in order to compute and present different financing plans to the customer.

Figure 2:
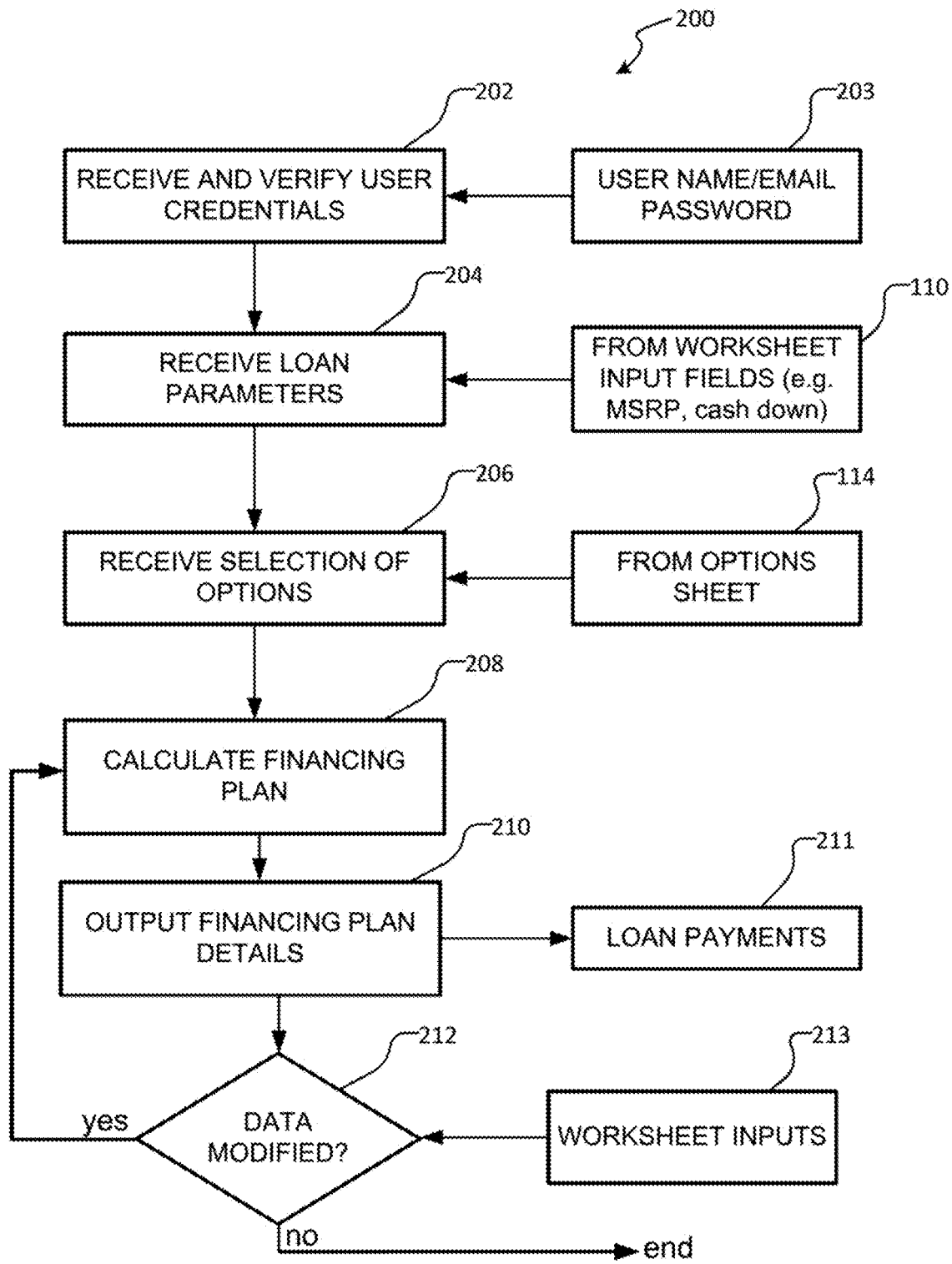
FIG. 2 illustrates a computer-implemented method of determining financing plans based on loan data, according to one embodiment.

FIG. 2 illustrates a computer-implemented method 200 of generating the particulars of a financing transaction for a customer according to one embodiment. This method may be carried out by system 100 of FIG. 1. For example, particular computations performed by method 100 may be carried out by a processor 112 of transaction server 102 of system 100. The determination of the financing transaction particulars may be based on information supplied by the user 106 through user interface 108.

Method 200 begins at block 202 with user 106 logging into the system 100 through user interface 108 by inputting his user credentials 203 (e.g. such as by user name/email address and password). Once the credentials 203 are verified and user 106 is logged in, user 106 creates a new profile for the customer or loads an existing customer profile. Details for the customer profile, such as customer name and customer contact information, may be input using user interface 108.

Figure 3:
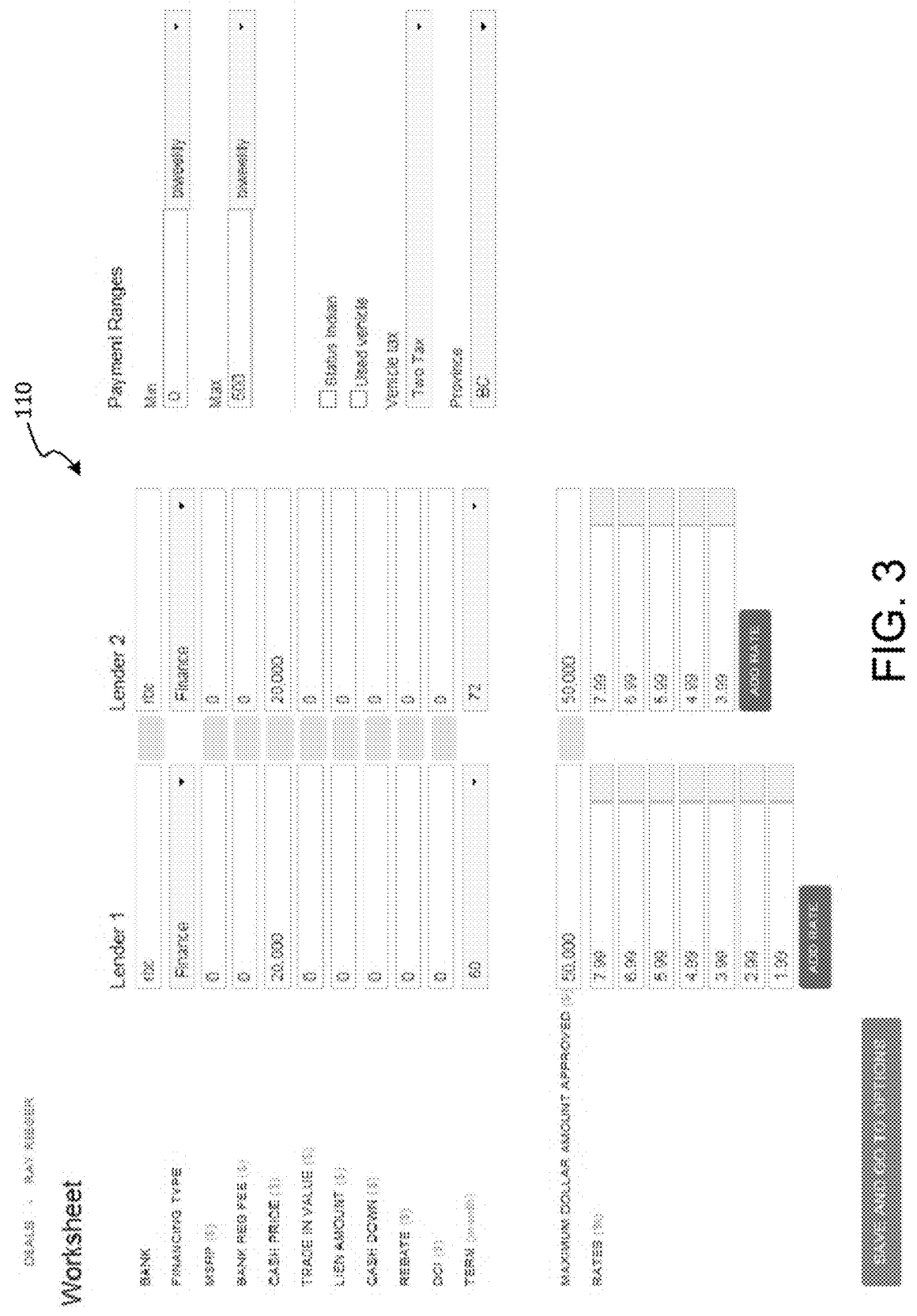

Method 200 proceeds to block 204 where the user 106 opens a worksheet 110 on user interface 108 to input, view and/or adjust the loan parameters. Worksheet 110 may comprise values for the loan parameters that have been approved and provided by the lender, in response to a loan application submitted by the dealer to the lender's server 120. In some embodiments, the approved loan parameter values are communicated by server 120 to financing transaction server 102, which then uses the information to populate various fields in worksheet 110. The information in worksheet 110 is then displayed on user interface 108 to user 106. Worksheet 110 may be configured to display and accept data for more than one financing plan so that the dealer (and optionally, his customer) can view and compare between different plans. For example, there may be financing plans offered by different lenders, and/or for the same lender more than one financing plan may be available. FIG. 3 shows an exemplary worksheet 110 that may be displayed on a user interface 108 to display and/or accept input concerning the loan parameters. As seen in FIG. 3, to compare between financing plans offered by different lenders, worksheet 110 may include a column for each lender (e.g. Lender 1, Lender 2, etc.). Worksheet 110 may include various input fields to display and/or accept loan parameters for each of the lenders. These input fields may include, for example:

Financing type—whether the transaction is a lease or sale;
MSRP (manufacturer's suggested retail price);
Bank registration fee;
Cash price of the vehicle;
Trade in value (if a vehicle is being traded in);
Lien amount;
Cash down—the amount of money the customer will be making as a down payment on the purchase;
Rebate—the amount of rebate the dealer will be extending to the customer;
DCI (Dealer Cash Incentive) (the dealer can choose to retain 100% of any DCI amount offered by the manufacturer, however, if the dealer wishes to make a transaction more attractive to a customer the dealer can enter the portion of the DCI that he is willing to give back to the customer to discount the vehicle purchase price (this will have the effect of lowering the interest rate and/or loan payment amount);
Term of the loan;
Maximum loan amount which the customer is approved for; and/or
One or more available interest rates for the loan.

In addition to the foregoing, worksheet 110 may include input fields for other parameters that may be helpful for the purposes of calculating and/or validating the costs and loan details, such as, for example: loan payment ranges (e.g. minimum and maximum values biweekly or monthly or for some other payment interval), and other factors that may be used in the determination of the loan amount, such as indication of "Status Indian", whether or not the vehicle is a used vehicle, and type of vehicle tax (e.g. no tax, one tax, two tax or three tax) and the province/state or other geographical region.

Once the loan parameters have been entered and saved, method 200 proceeds to block 206 at which one or more options sheets 114 (see examples in FIGS. 4A, 4B) may be displayed in user interface 108 to accept from the user 106 a selection of products to be purchased as part of the transaction. In certain embodiments, including in the illustrated embodiment of FIGS. 4A and 4B, the options relate to the products that are resold by the dealer to the customer. These products may include, for example: extended warranties, tire and rim protection, key fob protection, vehicle armour protection, paint protection, life and disability insurance, service contracts (such as those that include the sale of buy down points), and the like, which can be purchased by the customer along with the vehicle.

Figure 5:
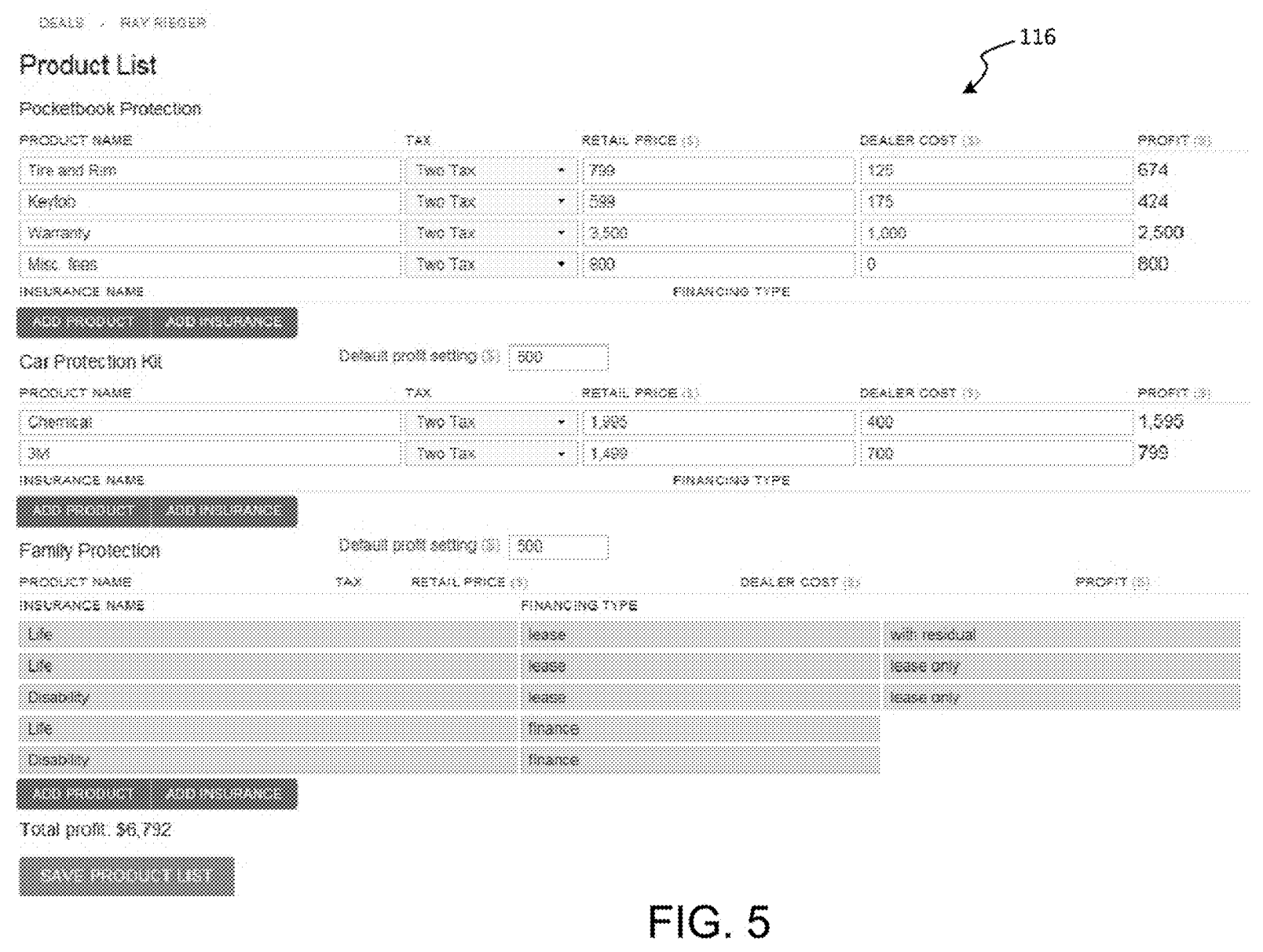

The dealer can initially set up the available product selections along with each product's retail price, dealer cost and tax structure, by entering the information into a product list sheet 116. An example product list sheet 116 is illustrated in FIG. 5. Alternately, a list of products along with their price, dealer cost and tax information may be pre-loaded into the product list sheet 116 and/or the user 106 may select from templates for the product lists. In some embodiments, the product provider server 124 provides such information to financing transaction server 100 and such information can then be used to populate product list sheet 116. For many products, the total cost to the customer for any particular product is typically the retail price plus any applicable taxes. The profit to be made by the dealer for reselling the product to the customer is typically the retail price minus the dealer/broker cost (price at which the dealer purchases the product).

Figure 4A:
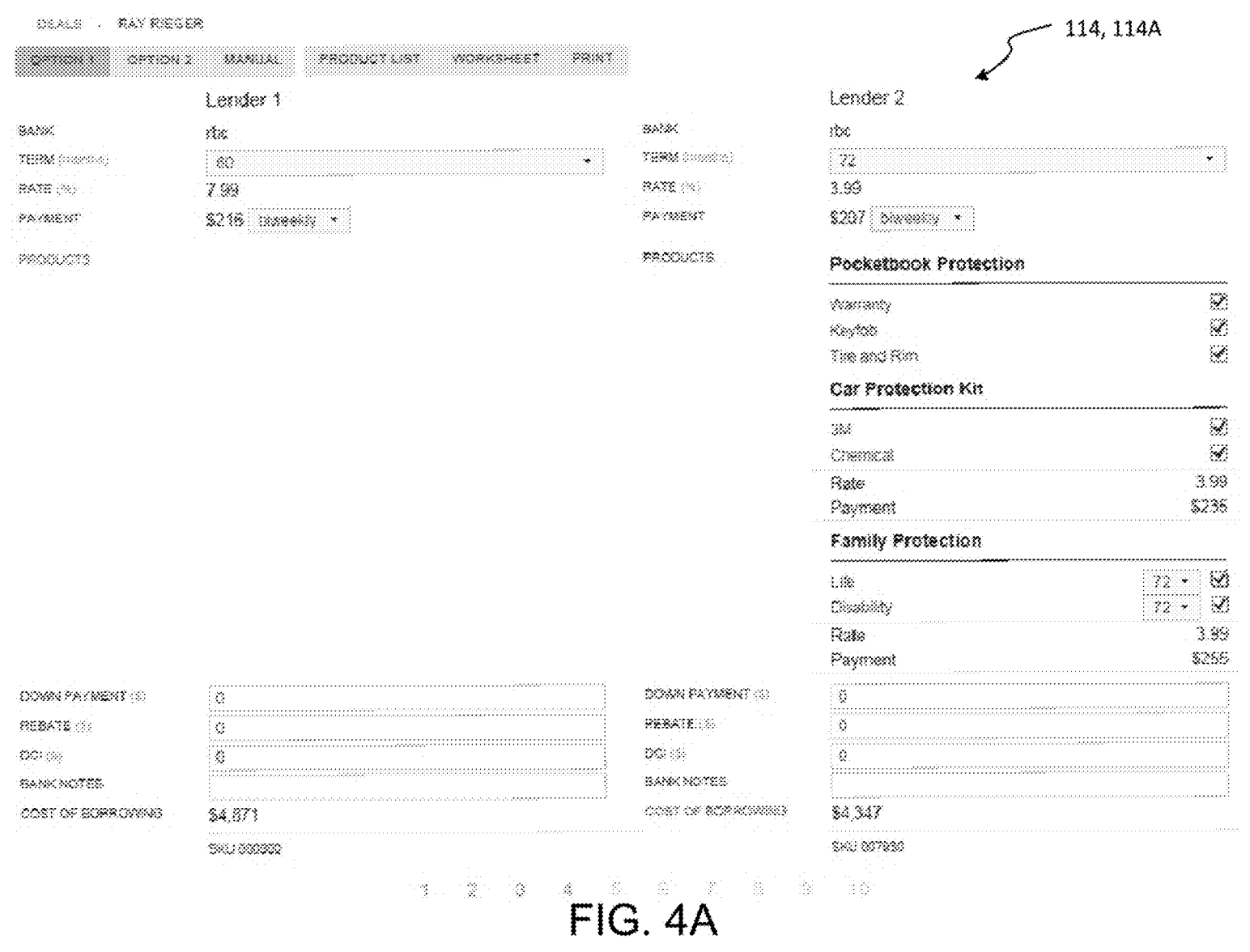
Figure 4B:
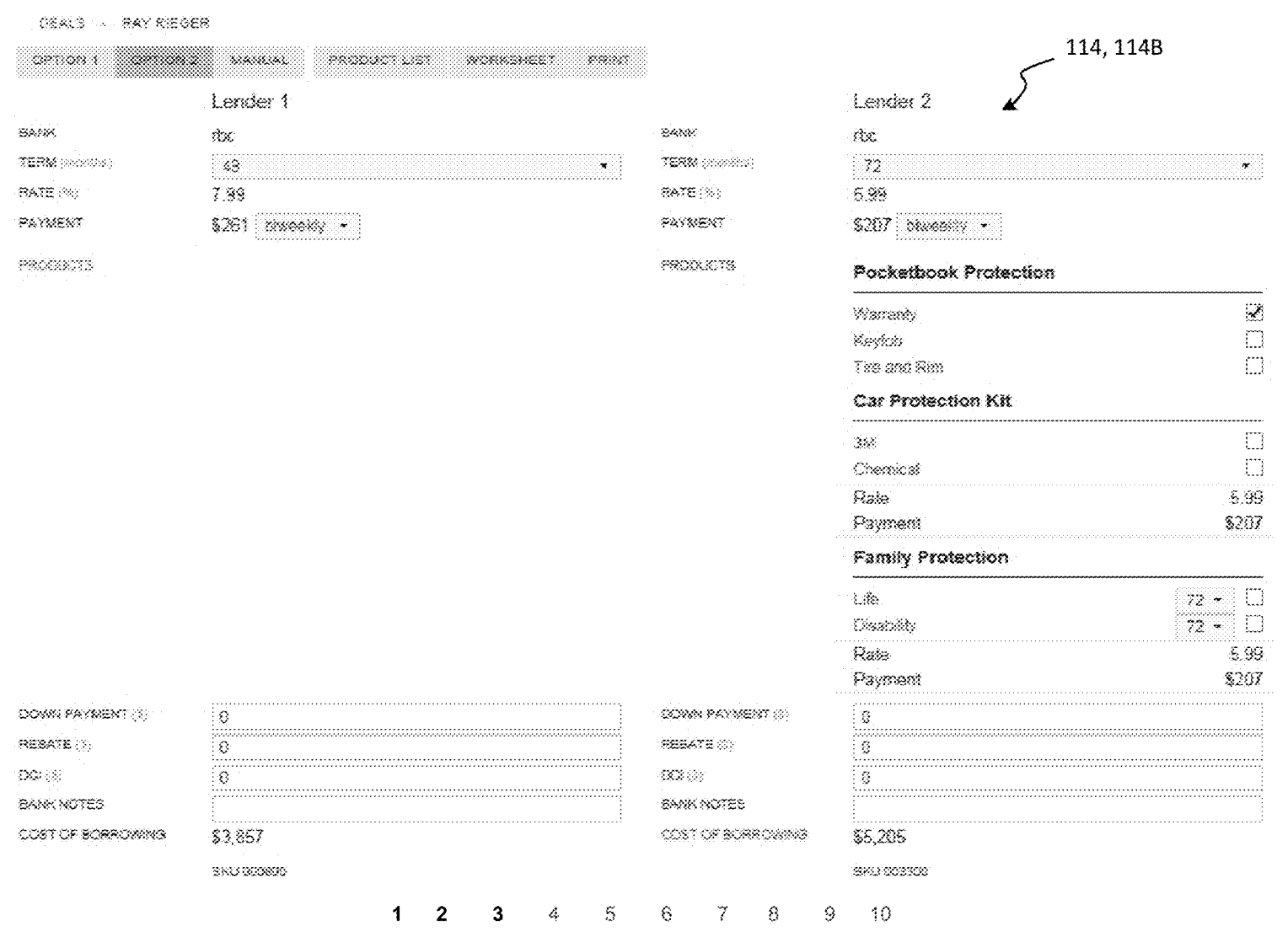

To enable comparisons between different financing plans for the same or different lenders, more than one option sheet may be provided (e.g. the tabs labelled as "OPTION 1" and "OPTION 2" as seen in FIGS. 4A, 4B can be used to select between two options sheets). For example, in the illustrated embodiment of FIG. 4A, first options sheet 114A, which is opened by selecting the tab "OPTION 1", displays a first set of financing plans from Lender 1 and Lender 2. As seen in FIG. 4B, second options sheet 114B, which is opened by selecting the tab "OPTION 2", displays a second set of financing plans from Lender 1 and Lender 2. In the illustrated embodiment, for each of the first product options sheet 114A of FIG. 4A and second product options sheet 114B of FIG. 4B, the loan from Lender 1 has no product options attached to it while the loan from Lender 2 has a list of one or more predefined product options attached to it. Thus, according to this set up, the customer may be able to compare a financing plan with no product options (from Lender 1) with a financing plan with different combinations of selected product options (from Lender 2) for two different scenarios, namely "OPTION 1" and "OPTION 2". For OPTION 1, all of the available product selections are added to the transaction involving Lender 2, while for OPTION 2, only one of the available product selections is added to the transaction involving Lender 2 (i.e. the warranty product).

It is not necessary that the transactions involving Lender 1 exclude products or that the transactions involving Lender 2 include products. If desired, one or more of the financing plans offered by Lender 1 may be modified to include the purchase of products. In the illustrated embodiment of FIGS. 4A and 4B, a list of the available product selections can be viewed and selected for Lender 1 by clicking on "Products" under Lender 1 in options sheet 114. Conversely, one or more of the financing plans offered by Lender 2 may be modified to exclude the purchase of products, by de-selecting the products on the listed products under Lender 2 in options sheet 114.

In some embodiments, Lender 1 is not necessarily different from Lender 2. For example, the user may set up the options sheets so that the same lender corresponds to both Lender 1 and Lender 2. This may be useful for comparing between financing plans with and without the purchase of any products from the same lender.

Once all of the initial data for the financing plans has been input at blocks 204 and 206, method 200 proceeds to block 208 by calculating the financing plans based on such data. The details of these financing plans (e.g. such as the amount of the loan payments 211) are then output to the user 106 at block 210. If further inputs 213 are received from worksheet 110 or options sheet 114 such that any of the loan data is modified at block 212 (e.g. products are added or removed, or any of the other loan data is modified, such as for example changing the term of the loan or frequency of payments or DCI amount that the dealer is prepared to give back to the customer), then method 200 proceeds to repeat blocks 208 and 210 by recalculating the financing plans using the modified data/options, and outputting the details of the recalculated financing plans, including the amount of the loan payments. Transaction server 102 is configured to repeat this process each time any modification is made to the loan data and to display the new values for the financing plans in options sheet 114.

Because the above process is executed quickly by transaction server 102 and is automatically performed in response to any input modification, user 106 can immediately view the results, i.e. the updated financing plans, upon making any kind of modification to the loan data. For example, the dealer's customer may inquire as to what effect adding a product will have to the transaction in terms of the amounts the customer has to pay. The answer to that question can be readily provided and displayed to user 106 simply by clicking on the check box next to the product of interest to add the purchase of such product to the transaction. Transaction server 102, in response to this input, recalculates the financing plan to generate updated values for the transaction, which may include updated values for the loan amount, predetermined interest rate (which may drop to the next available interest rate since the addition of the product increases the profits to the dealer), and/or loan payment amounts.

Figure 6:
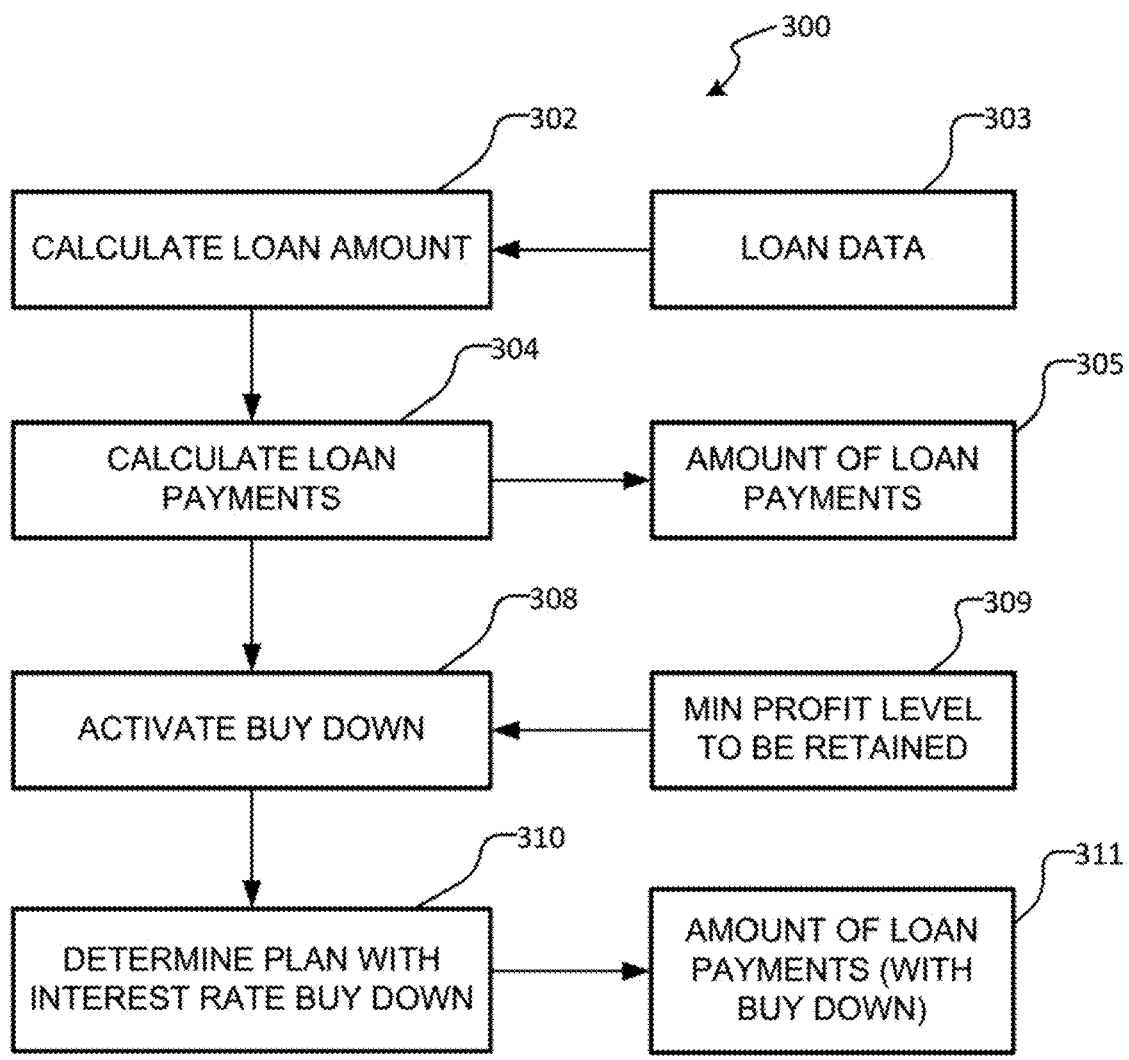
FIG. 6 illustrates a computer-implemented method according to one embodiment for calculating the payment details of a financing plan.

FIG. 6 shows a computer-implemented method 300 of calculating a financing plan in accordance with one embodiment. The steps at method 300 may be performed at block 208 of method 200 for each financing plan. Method 300 may be implemented by a computer processor 112 of the transaction server 102 of FIG. 1's system 100 carrying out instructions as provided by one or more functions 115 (FIG. 1).

Method 300 begins at block 302 by calculating the initial loan amount required by the customer. The initial loan amount will depend on the loan data 303 such as: the total costs to the customer (taking into account values such as the price of the vehicle, bank registration fee, trade in value, lien amount, down payment, rebates, taxes, price of the products purchased, etc.). This data may be obtained through worksheet 110 (FIG. 3) and product options sheet 114 (FIGS. 4A, 4B). The addition of products to the transaction is facilitated through options sheet 114 and affects the loan amount calculated at block 302. For example, in the illustrated embodiment of FIG. 4A (see options sheet 114A), no products are initially selected for the financing plan for Lender 1. Thus the calculations for the initial loan amount at block 302 of method 300 would not include the costs of any products. In such case, the initial loan amount is primarily determined by the cost of the vehicle (plus miscellaneous fees), minus the down payment and any trade in value and the rebate. However, where products are selected (as seen for the financing plan for Lender 2 in options sheet 114A of FIG. 4A, for example), the initial loan amount calculated at block 302 of method 300 will be higher because the customer will need to borrow additional funds in order to pay for the costs of the products which have been added to the transaction.

At block 304 of method 300, the size of the recurring loan payments 305 (for the particular loan amount determined at block 302) is calculated based at least partly on: a predetermined loan interest rate; a predetermined term of the loan (e.g. 60 months or 72 months, or some other term); frequency of payments (e.g. biweekly, monthly, etc.) and whether the transaction is a financing transaction (in which case the loan is fully paid off by the end of the term) or a lease transaction (in which case the loan may be only partially paid off by the end of the term). At block 304, the cost of borrowing may also be calculated for the term of the loan. The results of the calculations at block 304, namely the loan payment amounts (and optionally, the cost of borrowing) are output to the user as values displayed in options sheet 114 (see FIGS. 4A and 4B).

The predetermined loan interest rate that is used to calculate the loan payments 305 at block 304 may be selected from one of a plurality of available rates. For example, such rates may comprise: 7.99%, 6.99%, 5.99%, 4.99%, 3.99%, and the like (i.e. 1.0% increments, starting at 7.99%). In other embodiments, the available interest rates may be set at different increments, such as 0.50% or 0.25% increments, and may start at different interest rates (e.g. 5.95%, 5.45%, 4.95%, 4.45%, 3.95%, etc. for 0.50% increments starting at the interest rate 5.95%), and/or may be within a different range of interest rates. In some embodiments, the available loan interest rates may be based on the interest rates offered by the financial institution. The dealer may choose which of these offered rates should be included in the list of rates available to be selected as the predetermined loan interest rate. The available interest rates for Lenders 1 and 2 may be input into worksheet 110 by user 106 (FIG. 3) or the worksheet 110 may be populated with interest rates provided by financial institution sever 120.

In particular embodiments, one of the functions 115 implemented by processor 112 is an interest rate determination function 115B which generates the predetermined interest rate. Interest rate determination function 115B may accept inputs such as number of product options selected and amount of profits from the selected products (and the like), and determine based on such inputs the predetermined interest rate that should be used to calculate the loan payments for the financing transaction at block 304. Lower interest rates may be offered for more profitable transactions and conversely, higher interest rates may be set for less profitable transactions. This is because the amount of compensation provided by the financial institution or other lender to the dealer for facilitating the loan transaction typically is a function of the interest rate and the total amount to be financed. Generally, the dealer reserve (the amount of compensation that is paid by the lender to the dealer to facilitate the loan transaction) may be calculated based on a particular percentage of the total amount to be financed, a flat nominal dollar amount, and/or a combination thereof. For example, the particular percentage may be based on one or more of: the year of the vehicle to be financed, the length of the term of the loan, the length of the amortization period of the loan, the interest rate that is sold to the customer within the lender's program tiers, and other factors. Therefore, if the dealer is dealing with a purchase and sale transaction involving greater profits for the dealer (e.g. a transaction including the sale of products, as opposed to a transaction without any such products), then the dealer may be inclined to facilitate the financing of the transaction at a lower interest rate in order to incentivize and reward the customer for purchasing the additional products. Conversely, if the dealer is dealing with a purchase and sale transaction involving fewer profits for the dealer, then the dealer may be inclined to facilitate the financing of the transaction at a higher interest rate to still keep the overall transaction profitable for the dealer by increasing the dealer reserve.

In particular embodiments, the interest rate may be selected by processor 112 executing interest rate determination function 115B, based on configurable threshold levels of profits. The total profit to the dealer for a transaction may be determined by adding the dealer reserve (for facilitating the loan) to any profits from the sale of products. A total profit below a certain threshold amount (e.g. $250) may result in the highest interest rate being selected as the predetermined interest rate (e.g. 7.99%). A total profit at the next tier (e.g. between $250 to $750) may drop the predetermined interest rate to the next level (e.g. 6.99%), and so on. The lowest available interest rate (e.g. 2.99%) may be selected as the predetermined interest rate where the total profit is above the highest threshold amount (e.g. $3000).

Another factor that may affect the selection of the predetermined interest rate is the maximum amount of a recurring loan payment that is within the customer's budget (e.g. $200 biweekly), or a desired payment range of the customer (e.g. $200 to $250). In particular embodiments, the processor 112 executing interest rate determination function 115B bases the determination on the configurable threshold levels of profit as described above, but the processor 112 may adjust the initially determined interest rate to the next lower interest rate if the resulting loan payments at the initial interest rate causes the loan payment amounts to exceed the maximum loan amount which may be set by user 106 in worksheet 110.

Another method that interest rate determination function 115B may use to determine the predetermined interest rate is based on the tiers of products. As explained above, in certain embodiments each product may be classified into one of these groups: warranty protection, car protection, family protection and service contracts (e.g. buy down points). In some embodiments, where no products are included with the transaction, then the default is to select the highest available interest rate as the predetermined interest rate. The selection of all or some of the products within a first group, such as warranty protection, may cause the predetermined interest rate to drop to a certain interest rate. The selection of all or some of the products within a second group, such as car protection, in addition to the first group may cause the predetermined interest rate to drop to an even lower interest rate (and so on). Similarly, the selection of a service contract (by selecting one or more buy down points, for example) may cause the predetermined interest rate to drop to a lower interest rate. In some embodiments, the predetermined interest rate that is generated by processor 112 can be manually overridden by the user 106 entering another value for the predetermined interest rate for the transaction in options sheet 110.

The predetermined interest rate acts as the starting point for calculating the loan payments for a transaction. These loan payments may be displayed to user 106 in options sheet 114. As explained below, this starting interest rate can be further reduced by processor 112, at the option of user 106 (e.g. by the user 106 activating the interest rate buy down or setting a profit setting that allows profit sharing with the customer, buying down the interest rate for the customer), in order to help encourage the sale of products.

Where one or more products are selected for purchase by the customer, then the loan payments calculated at block 304 will take into account the additional product costs, which increases the size of the loan amount. However, in many cases it is desirable to make a transaction that includes the sale of products more attractive to the customer by offering different plans with a further reduced interest rate. As such, method 300 has the option—initiated after receiving a command from user 106 to activate an interest rate buy down at block 308 (or profit setting)—to recalculate a financing plan at block 310 whereby a portion of the dealer's profit from the product sales is used to buy down the interest rate. This reduces the interest rate and cost of borrowing for the customer, while allowing the dealer to keep at least the minimum amount of profit specified by the dealer through options sheet 114. The extent of the interest rate buy down depends on the amount of dealer profits made by the sale of products in the transaction and the minimum profit level 309 that the dealer wishes to keep. In the illustrated embodiments the minimum profit level 309 can be indicated by the user 106 and setting the profit setting to such minimum profit level 309 activates the interest rate buy down.

In accordance with particular embodiments, the block 310 calculations may determine that, for a particular minimum profit level retained by the dealer, the greater the profits from the sale of products, the greater the interest rate buy down from the initial or predetermined interest rate for that transaction. For example, where the products have a profit below a first threshold value, the block 308 calculation may apply some of the funds from the sale of the products to drop the interest rate to the next lower level (e.g. from a predetermined interest rate of 5.99% to 3.99%). Where the products have a profit above the first threshold value but below a second threshold value that is higher than the first threshold value, the block 308 calculation may apply some of the funds from this sale to buy down the predetermined interest rate to the next lower level (e.g. from 3.99% to 5.99%)—and so on for successively increasing threshold values for the profits.

In summary, options sheet 114A includes checkboxes for the selection of various products to be added to the transaction (e.g. such as extended warranties, tire and rim protection, key fob protection, vehicle armour protection, paint protection, life and disability insurance, service contract such as the sale of buy down points, etc.). The costs for the selected products are added to the amount that is financed, and increases the loan amount. At blocks 302 and 304, the loan amount (for a predetermined interest rate) and the size of the loan payments are determined. When the user activates the interest rate buy down at block 308 (or sets a profit setting that activates the interest rate buy down), the method 300 proceeds to block 310 by recalculating the interest rate and loan payments (based on what the user 106 has indicated is the minimum amount of profit that should be kept), and outputs the loan payment amounts 311 for a plan with the interest rate buy down.

The following are example scenarios showing how the interest rate buy down computations may be implemented in practice, based on the example values shown in the product list sheet 116 of FIG. 5. For the first scenario depicted in FIG. 4A, in regard to the plan corresponding to options sheet 114A involving Lender 2, all of the products are selected for purchase (including extended warranty, key fob protection, tire and rim protection, car protection kit, and life and disability insurance) yielding a total of $7930 in profit for the dealer and increasing the total purchase price by at least $9000. If all of these profits are retained by the dealer (i.e. no profit from the sales of these products is being used to buy down the interest rate), then as determined by the interest rate determination function 115B, the initial or predetermined interest rate in this scenario is 3.99% assuming that the customer decides to purchase all of these products. At this interest rate, each of the biweekly loan payments is $255 over the 72-month term of the loan. To view the cost of borrowing for the customer, user 106 can click on "Cost of borrowing" to view the total interest charges over the term of the loan. In this case, the cost of borrowing computed by the system is $4347.

The above-described plan can be compared to a second scenario in relation to a plan corresponding to options sheet 114B involving Lender 2, as depicted in FIG. 4B. For this plan, only one product is purchased, namely, the extended warranty, yielding a total profit of $3300. In this case it is determined by the interest rate determination function 115B that the initial interest rate is 5.99% —a higher interest rate is selected since the profit is lower than for the plan involving Lender 2 of the first scenario. At this higher interest rate, the biweekly loan payments over the 72-month of the term are determined to be $207 (which is less than the plan shown in FIG. 4A's options sheet 114A for Lender 2, given that the total loan amount required to be paid back in this scenario is less). However, since the interest rate is higher, the cost of borrowing computed by the system is higher for the plan represented by options sheet 114B for Lender 2—i.e. $5205 as displayed in FIG. 4B.

Financing plans which do not include the purchase of products can be determined and presented to the customer for comparison purposes. For example, options sheets 114A and 114B include plans from a Lender 1 that do not include the sale of any products. These can be compared to plans from a Lender 2 that includes the sale of various products, with or without an interest rate buy down activated. As seen in FIGS. 4A and 4B, for the plan shown in options sheet 114A from Lender 1, the interest rate for a 60 month term is determined to be 7.99% and, at this rate, the biweekly payments are $216 over the 60 month term. For the plan shown in options sheet 114B from Lender 1 the interest rate is also 7.99%, and at this rate, the biweekly payments are $261 over the 48 month term. The cost of borrowing for the 48-month plan shown in options sheet 114B from Lender 1 is $3,857, which is less than the cost of borrowing for the comparative 60-month plan shown in options sheet 114A from Lender 1 (i.e. $4,871) since for the other 48-month plan shown in options sheet 114B, the loan amount is paid back over a shorter term. For these transactions involving Lender 1, the total profits in each case to the dealer is $800. This is significantly less than for the other scenarios for Lender 2 involving product purchases; hence, a higher initial predetermined interest rate is selected for the plans from Lender 1.

FIGS. 4C and 4D show an alternate way of representing the information provided in options sheets 114A, 114B. The information is shown in the form of reports 117. Reports 117 may be output by: printing the reports, and/or displaying the reports through user interface 108 on user device 104. Report 117A (FIG. 4C) corresponds to the plans from Lenders 1 and 2 as shown in options sheet 114A. Report 117B (FIG. 4D) corresponds to the plans from Lenders 1 and 2 as shown in options sheet 114B. The second column, on the right hand side of each report 117, lists the selected products under their respective groups (e.g. warranty, car protection kit and family protection). The second column of report 117A shows the interest rates and payment amounts should the customer choose to purchase warranty protection only ($207 biweekly payments and interest rate of 3.99%), warranty protection with car protection kit ($235 biweekly payments and interest rate of 3.99%), and warranty protection with both car protection kit and family protection ($255 biweekly payments and interest rate of 3.99%). This report summary allows for a quick visual comparison between the different options for the transaction.

Figure 7B:
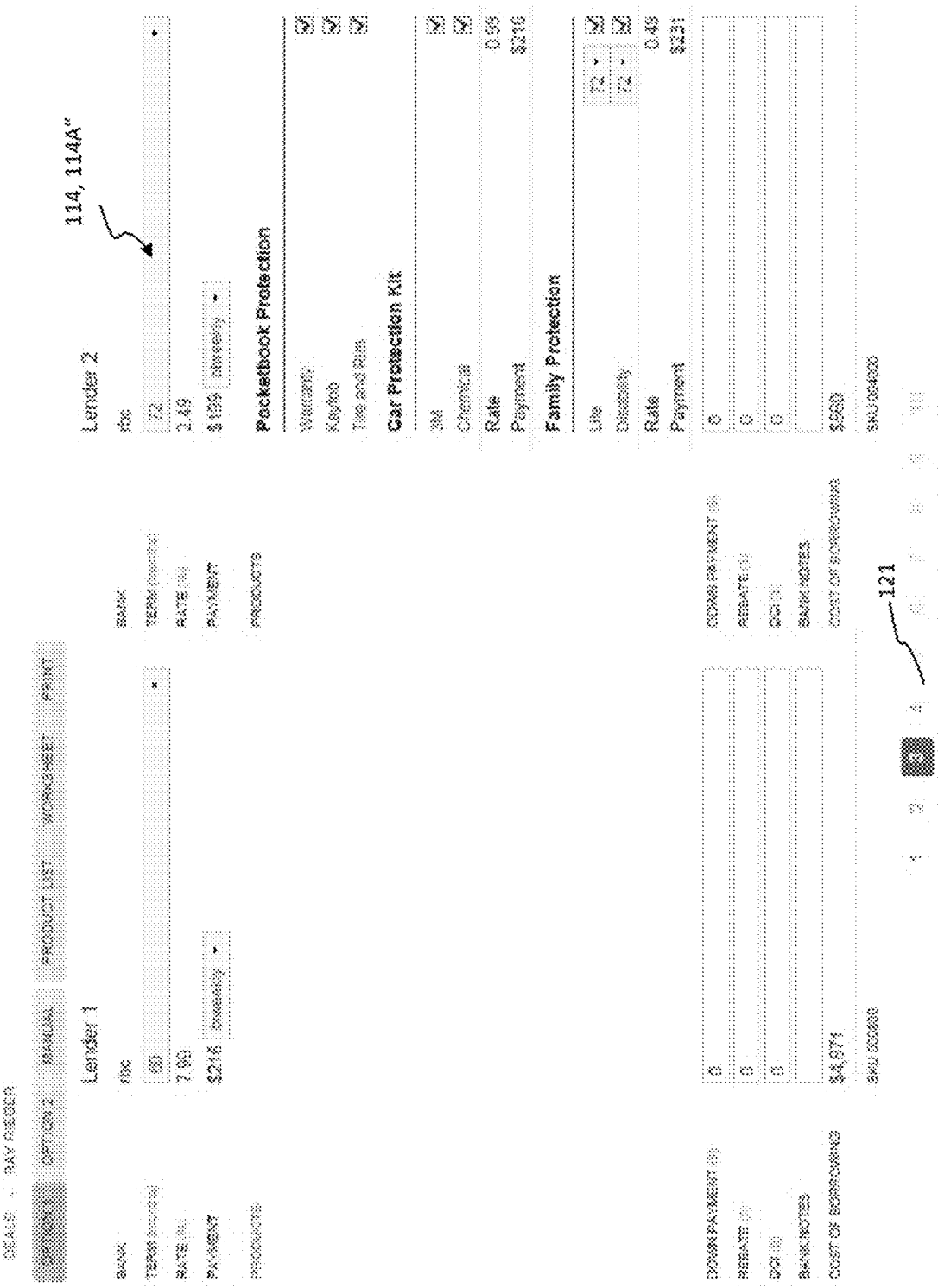

In order to advance negotiations with a customer, user 106 may decide that it would be acceptable to retain less profit from the transaction, thereby freeing up a certain amount to help buy down the interest rate. In such case, the dealer parts with a portion of the dealer's profit and applies this portion to lower the interest rate for the customer. In the examples described herein with reference to the illustrations, only the profits made from the sale of warranty products are available to buy down the interest rate. However, this is not necessary, and in other embodiments, the profits made from the sale of other categories of products (such as, for example, car protection and family protection products and service contracts) may be available to buy down the interest rate, in addition to, or in lieu of, the profits from warranty products. With reference to FIG. 4A, for the first plan shown in FIG. 4A's options sheet 114A (from Lender 2), user 106 may decide that he wishes to retain profits of $4000 from the example transaction, freeing up the remaining amount of $7930−$4000=$3930 to buy down the interest rate. At block 308, the user 106 can activate the interest rate buy down action by selecting, for example, the buy down level of "4" as the minimum profit level 309 to be retained (indicating that $4000 is the minimum profit the dealer will be keeping from the transaction). In that case the portion of the profits that the dealer is willing to part with (i.e. $3930, which comes from the profits made by the dealer from the sale of the warranty products) will be provided to the lender to pay part or all of the interest charges, and buy down the interest rate. In this case, upon selecting "4" as the level of interest rate buy down, it is determined by the processor 112 that the resulting interest rate decreases from 3.99% to 1.49% for a plan which includes the purchase of all of the warranty protection, car protection and family protection products. The biweekly payments are also decreased, to $238 over the term of the loan. The cost of borrowing also decreases, to $1699. By comparison, if the customer wants to purchase only the warranty protection and car protection kit (and not the family protection product), then in activating the interest rate buy down to the level "4", the interest rate decreases from 3.99% to 1.99%; the biweekly payments are $223. These plans are illustrated by options sheet 114A' for Lender 2 in FIG. 7A, which has the same parameters and options as the options sheet 114A for Lender 2 in FIG. 4A except that in FIG. 7A, the user 106 has activated the buy down level of "4" on options sheet 114A' by clicking on the number "4" on the interest buy down menu 121 shown at the bottom of the display.

If user 106 wishes to be more aggressive in pricing the financing plan for the customer, then user 106 may activate a greater buy down level (i.e. applying an increased amount of the profits to buy down the interest rate for the customer). At block 308, user 106 can select the buy down level of "3", for example (indicating that $3000 is the minimum profit the dealer will be keeping from the transaction). For the above scenario, this would mean that the dealer is now parting with $4930 in profits (again, these profits come from the sale of the warranty products). Processor 112 determines that after applying those profits to the interest charges, the interest rate is bought down even further, i.e. to a 0.49% interest rate assuming that the customer is purchasing warranty, car protection and family protection. The resulting biweekly loan payments are $231 over the term of the loan. The cost of borrowing is now decreased to $560. This is illustrated in the options sheet 114A" for Lender 2 in FIG. 7B, which has the same loan parameters and selected options as the options sheet 114A' for Lender 2 in FIG. 7A except that in FIG. 7B, user 106 has activated the buy down level of "3" on options sheet 114A" by clicking on the number "3" on the interest buy down menu 121 shown at the bottom of the display.

Thus, in the foregoing example, simply by clicking on one of the interest buy down buttons "4", "3", or "2", etc. (corresponding to the minimum amount of profit the dealer will be keeping from the transaction, in 1000's), an interest rate buy down is activated and the new interest rate and loan payment amounts are automatically generated by system 100 and displayed to the customer. The cost of borrowing may also be generated and displayed by system 100. The greater the costs of the products purchased, the greater the profits for the dealer that are potentially available to help buy down the interest rate. In particular embodiments, one of the functions 115 that may be executed by computer processor 112 of transaction server 102 is a buy down validation function 115A which determines the expected profits from the transaction (based at least in part on the selected product options in options sheet 114) and determines which buy down thresholds are valid and which buy down thresholds are not valid based on those profits. Validation function 115A determines which of a plurality of discrete buy down levels can be activated by the user 106 at step 308 of method 300. For example, where the profits from the warranty products of the transaction exceed $3000 (but do not exceed $4000), then buy down validation function 115A determines that interest buy down buttons "1", "2", "3" should be made active and clickable by the user to activate the buy down. The other interest buy down buttons "4", "5", etc. are not valid and may be greyed out and made inactive (as seen, for example, in the options sheet 114B illustrated in FIG. 4B where only a single warranty product is selected).

The system described herein is configured such that the user 106 clicking on one of the available levels of interest rate buy down (e.g. 4 for minimum profit of $4000, 3 for minimum profit of $3000, and so on) communicates the portion/amount of profit the dealer wishes to keep (while the remainder portion of the profit is applied to buy down the interest rate), and activates the interest rate buy down calculations for the indicated profit level. As soon as the user 106 clicks on one of the levels (e.g. 4, 3, 2 etc.), the interest buy down calculations at method 300's block 310 are performed. If the user clicks again on the same level then the options sheet 114 reverts to displaying details for the financing plan without any interest rate buy down (i.e. where the entire profits from the transaction are retained by the dealer rather than a portion thereof going toward buying down the interest rate).

Figure 8:
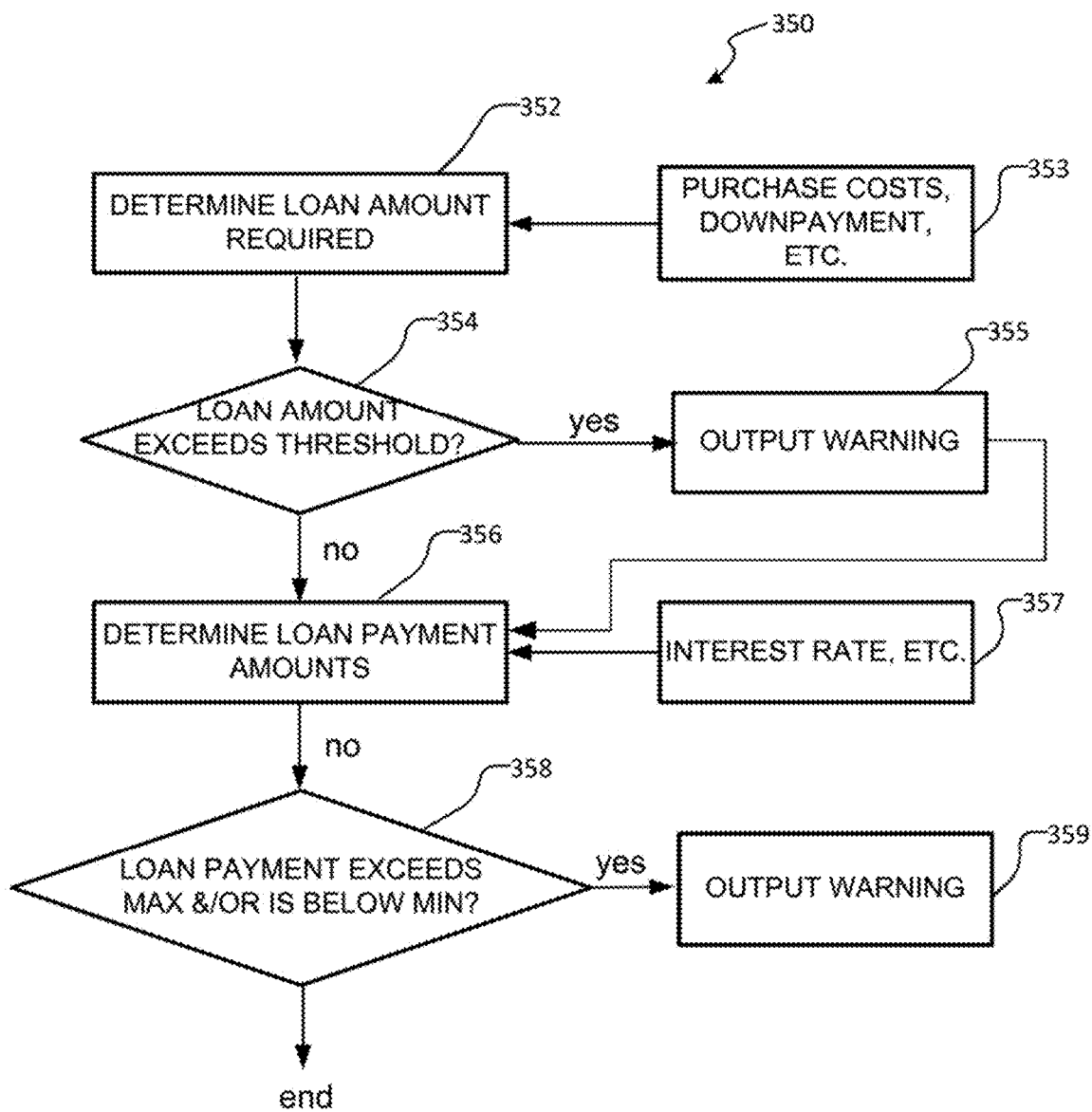
FIG. 8 illustrates a computer-implemented method of validating the loan amount and loan payment amounts in accordance with a particular embodiment.

In some embodiments, the functions 115 that may be executed by processor 112 of financing transaction server 102 include a loan amount and payment validation function 115C. This function generates a warning in the event that the calculated loan amount or loan payments exceed the predetermined threshold values. An example method 350 that may be implemented by function 115C is shown in FIG. 8. Computer-implemented method 350 begins by determining or obtaining the loan amount at block 352. The loan amount is based on the purchase costs (including the vehicle cost and any added products), the down payment and other variables 353. At block 354, method 350 compares the loan amount obtained at block 352 to a threshold amount. In particular embodiments, the threshold amount is the maximum loan amount approved by the lender for the plan. This may be determined by the lender, and may be part of the information that is communicated from the loan approval module 122 of financial institution server 120 (see FIG. 1), to financing transaction server 102, as part of the process for reviewing and approving the loan application. At block 355, if the loan amount exceeds the threshold amount, a warning is output to user 106.

The method 350 proceeds to block 356 at which the loan payment amounts are obtained or determined. Such loan payment amounts depend on the interest rate and other variables 357 (one example method of calculating such loan payment amounts is described above with reference to computer-implemented method 300 of FIG. 6). At block 358 of method 350, the loan payment amounts are compared to maximum and/or minimum thresholds for the loan payment amounts. Maximum and/or minimum thresholds for such payments may have been input by user 106 into worksheet 110 when setting up the financing plans (however, such thresholds are optional in particular embodiments). For example, the customer might communicate to the dealer that he does not want his biweekly payments to exceed $500. Thus, user 106 may input $500 as the maximum biweekly payment amount in worksheet 110. If the calculated loan payment amounts exceed the maximum payment amount and/or is outside of the payment range (which parameters may be set by user 106 in worksheet 110), then at block 359, a warning is output to user 106 to that effect.

Thus, method 350 verifies that the loan amount and loan payments are within the acceptable parameters and outputs a warning when they are outside of those parameters. The warning may be in the form of a warning message displayed in options sheet 114 which communicates the issue (e.g. approved loan amount exceed, or maximum loan payment exceeded). The warning message may be highlighted and/or displayed in a different color to draw the user's attention to the warning. Other non-limiting examples of warning mechanisms which may be triggered when the loan amount and/or loan payments are outside the acceptable parameters include, for example, causing to be displayed a pop-up warning screen on user interface 108 on user device 104, causing to be sounded an audible warning signal on user device 104, causing a tactile response to be initiated on user device 104 (e.g. vibration of the user device or the like), causing to be displayed a warning light on the user device 104, and the like. Once a warning is triggered, user 106 may be prompted by the financing transaction server 102 to adjust the loan data, such as by de-selecting one or more of the selected product in the event that the approved loan amount or maximum loan payments are exceeded. Each time a modification is made to the loan data, the new financing plan is recalculated (see blocks 208 through 212 at FIG. 2) and method 350 may be reapplied to the recalculated amounts.

In the course of discussing or negotiating a transaction with a customer, loan data can be modified or otherwise adjusted at any time by the dealer representative and the financing plans can be recalculated after each modification. For example, the customer may be undecided about whether to add a particular product, such as a warranty, to the transaction and may inquire as to the increase in loan payments if the product is added. The customer may also want to compare between different plans with different product selections. Without the use of a system as described herein, the updates to the financing plans and calculations of different financing plans for comparative purposes are challenging to implement. Even with the aid of a calculator, the calculations required to determine the loan amount and interest rate buy down details (for a given amount of profit kept by the dealer) after any modification to the product selection (or other loan data) are difficult and time-consuming. The methods and systems described herein allow for financing plans to be quickly and dynamically calculated and updated by a computer processor each time a modification to a loan parameter or product selection is made, and facilitates the immediate communication of this information to the dealer. The system can help increase the number and value of transactions for a dealer, since a dealer will be able to quickly determine and evaluate plans that include or do not include the purchase of various combinations of products, and provide information to the customer concerning details of the financing plans that may help the customer to decide on a particular option. The system is also less prone to error in determining the proposed financing plan details than traditional or conventional methods. In addition, for a given vehicle sales transaction (which may include the purchase of products as part of the transaction), the system verifies if there are sufficient profits available to the dealer to enable an interest rate buy down. The system displays only valid levels of interest rate buy down, and in response to receiving an interest buy down activation from the dealer, determines and selects a new interest rate based on the particular loan parameters and amount of profits being used to buy down the interest rate.

In particular embodiments, one or more functions 115 may be provided, which when executed by the processor 112, generate at least two comparative financing plans wherein the loan payment amounts between the plans are the same (or similar). The output and display of such comparative plans may facilitate the purchase of one or more products by a customer. An example of a first plan generated by the execution of such functions would be a higher interest rate transaction (e.g. 5.99%) with no product options purchased. An example of a second plan generated by the execution of such functions would be a lower interest rate transaction (e.g. 1.99%) involving the purchase of one or more product options. If needed, processor 112 executing functions 115 may adjust the loan parameters for the second plan, such that the resulting loan payment amounts are the same (or within a certain configurable range) of the loan payment amounts calculated for the first plan. To make the second plan more attractive to the customer, the loan parameters may be adjusted by, for example, lowering the interest rate, and/or extending the term of the loan for the second plan. The details of each financing plan including the adjusted loan parameters are then displayed in options sheet 114 so that the customer can see that in exchange for opting to purchase certain products he will receive a financing plan with the same or similar loan payment amounts as the first plan and/or with a lower cost of borrowing than the financing plan without any products.

In any one of the embodiments described above, processor 112 of financing transaction server 102 executes one or more functions to determine and/or select an interest rate for the predetermined interest rate, or the new interest rate (e.g. in response to an interest rate buy down activation initiated by the dealer). In some situations, the processor 112 performs steps to select the interest rate. This may be applicable for setting the starting or predetermined interest rate, for example, where the predetermined interest rate may be selected from one of a plurality of available interest rates (such as 7.99%, 6.99%, 5.99%, 4.99%, 3.99%, etc.) by the processor 112 comparing the expected profits to configurable threshold levels of profits as explained above. In other situations, processor 112 calculates the interest rate. This may be applicable where the dealer chooses to pay to the lender a portion of the expected profits from the transaction, which reduces the interest charges and buys down the interest rate for the customer. In particular embodiments, the calculated interest rates are rounded up by the processor 112 to the next interest rate increment. For example, in some embodiments, the interest rates are defined in 1.0% increments, starting from 0.99%. Thus, if the calculated interest rate is 2.38%, then the processor 112 determines that the calculated interest rate of 2.38% falls in the interest rate bracket of 2.00% to 2.99%, and adjusts the interest rate to the highest rate in this bracket (i.e. 2.99%). The adjusted interest rate of 2.99% may then be used by processor 112 to calculate the loan payment amounts. Where the interest rate is rounded up to the next predefined increment level (i.e. to the highest interest rate within the applicable predefined interest rate bracket), any additional interest charges which are above those that are charged by the lender for the transaction may be retained by the dealer as compensation for facilitating the transaction. In other embodiments, the interest rates may be defined in other increments, such as 0.50% or 0.25% increments, and may start from different interest rates.

In some exemplary embodiments, a particular product offering includes service contracts. Such service contracts may be priced using buy down points or units, at a certain price per points. The sale of buy down points is a service contract, wherein in exchange for purchasing a buy down point from the dealer, the customer is provided a loan at a lower interest rate than the customer would otherwise receive without purchasing the buy down point. In some embodiments, the purchase of each buy down point drops the interest rate to the next lower interest rate in the loan program.

Each time a buy down point is selected to add to a transaction, the dealer cost of that buy down points is determined by the system as the amount that the dealer is paid to facilitate a loan transaction at the next lower interest rate in the lender's lending program. That price may be determined to compensate the dealer for the fact that facilitating the transaction at a lower interest rate would generally result in a decrease in the dealer reserve. So, for example, if the dealer would make $60 less in dealer reserve for facilitating the transaction at the next lower interest rate, the dealer cost of one buy down point to reduce the interest rate to this next lower interest rate would be $60. If desired, the dealer can price the buy down point to make a profit (e.g. the dealer can sell the buy down point for $100, hence netting $40 in profit if the dealer cost for the buy down point is $60). In addition, the cost of each successive buy down point is calculated by the system taking into account that the purchase cost for the buy down point is added to the loan and increases the total amount to finance, which will increase the dealer reserve.

To provide incentives for the customer to enter a transaction, the dealer may choose in some cases to apply some of the dealer's profits from the sale of the loan (e.g. profits in the form of the dealer reserve plus any profits from the sale of buy down points under a service contract) to further lower the interest rate for the customer. As such, the sale of a service contract, using buy down points, enables a form of profit sharing as between the parties to the transaction. In certain embodiments, the system has a variable profit setting, which can be set at either a fixed expected dollar amount or a certain percentage of the profits expected from the transaction. The dealer can use this profit setting to set a minimum amount of profit that they want to retain. The remaining profit is applied to buy down the interest rate for the customer even lower that what is originally offered to the customer. Thus, in a case where the expected overall dealer profits from a transaction (including sale of products) are $12.916.61, a profit setting of 40% would mean that the dealer retains 0.40×$12,916.61=$5,166.64 of the profits and uses the remainder to buy down the interest rate for the customer.

Figure 18:
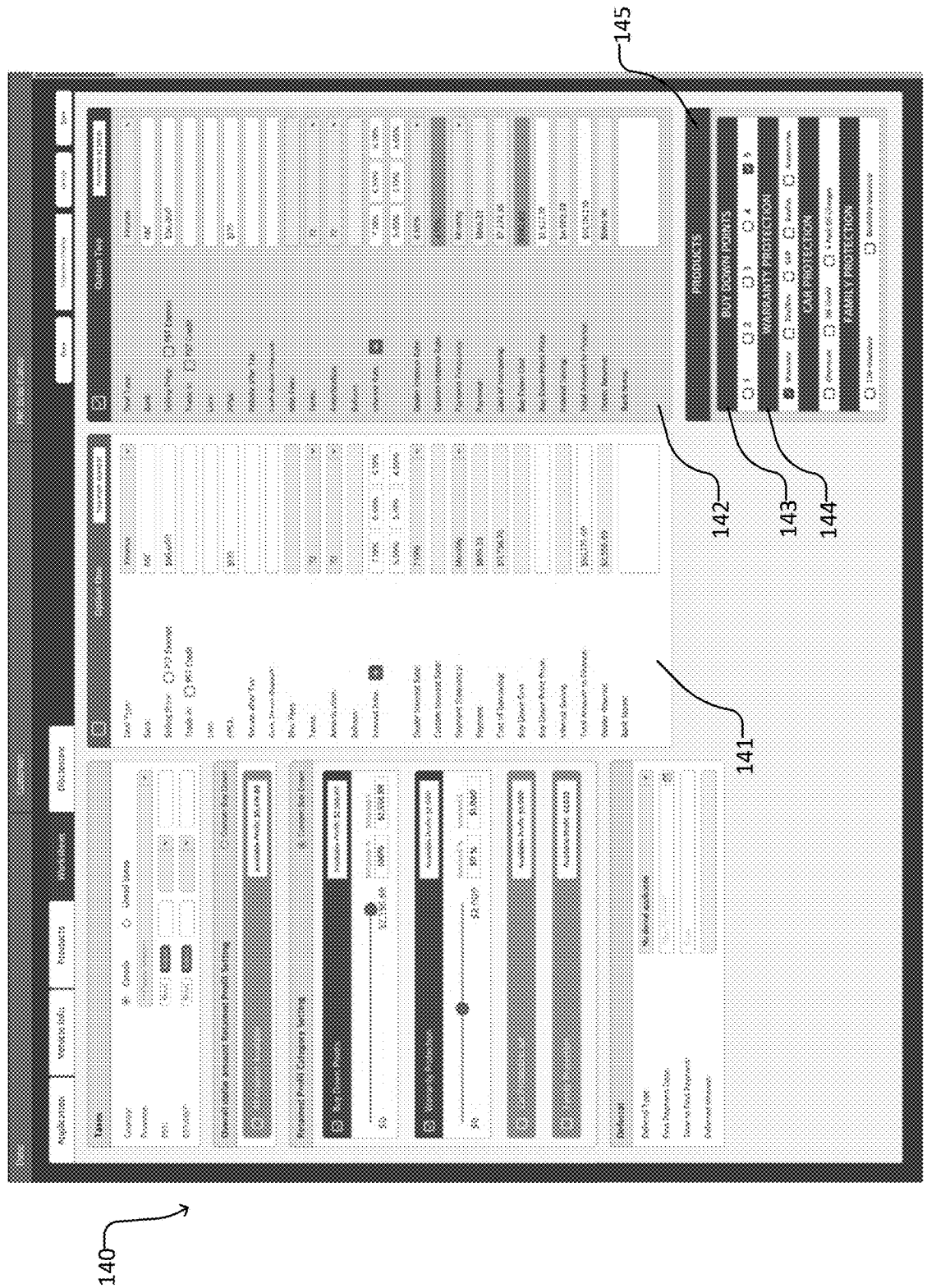
FIG. 18 illustrates a dealer worksheet that can be used by a dealer to configure a financing plan for a vehicle purchase including five buy down points and one warranty product.

In some embodiments, the system allows for multiple profit settings, each profit setting applicable to the sale of a certain category of products (e.g. one profit setting for the service contract, another profit setting for warranty protection products, etc.). With multiple profit settings, the dealer can customize the amount of profit they retain from the sale of each category of product. For example, FIG. 18 shows a dealer user interface enabling one profit setting to be applied to the service contract, e.g. providing the loan at a certain interest rate (under the heading "Buy Down Points" in the illustration), and another profit setting to be applied to warranty protection products (under the heading "Warranty Protection" in the illustration). The profit setting may be set by the dealer using one or more control elements. In the illustrated example of FIG. 18 there are three types of control elements for the profit setting: a slider, an input for a percentage, and an input for a fixed dollar value. One of these control elements may be used by the dealer to set the profit setting. The system determines the maximum profit from the category (given the products that have been selected within that category) and constrains the slider to accept only values for the variable profit setting not exceeding a maximum profit from the purchase. Similarly, if the input for the fixed dollar value that is entered is higher than the determined maximum profit setting, than the system rejects the input and/or displays only the maximum profit setting in the input. In the illustrated example of FIG. 18, exemplary available profit values are shown for each category of products, as well as for all products combined.

An exemplary implementation of a service contract is described below using buy down points, with reference to a lending program for a certain tier (referred to as Tier 1 in the example) as shown in Tables 1A and 1B below (collectively, Table 1). In this example, a customer may qualify for a Tier 1 loan for a transaction which meets the following constraints: term of between 12 and 84 months; amortization of between 12 and 84 months; year of vehicle between 2015 and 2019; and amount to finance between $40,000 and $100,000. Where the transaction does not meet those constraints, other tiers with other constraints and interest rates may be applicable. The table below lists the available interest rates on a Tier 1 loan on a $60,135 total amount to finance on 72 months term, and outlines the cost of purchasing each buy down point to lower the interest rate to the next lower interest rate.

TABLE 1A

TIER 1

| Rates | Percentage | Dealer Reserve | Cost of borrowing | Interest savings | Cost of buy down points | Number of buy down points |
|---|---|---|---|---|---|---|
| 7.19% | 5.1% | $2,556.89 | $11,736.76 | $ 0 | $ 0 | 0 |
| 6.59% | 5.0% | $2,509.26 | $10,709.54 | $1,027.22 | $ 50.18 | 1 |
| 6.19% | 4.4% | $2,221.49 | $10,083.02 | $1,653.74 | $ 353.42 | 2 |
| 5.99% | 3.7% | $1,881.33 | $ 9,808.82 | $1,927.93 | $ 711.86 | 3 |
| 5.19% | 2.8% | $1,436.83 | $ 8,513.87 | $3,222.88 | $1,180.25 | 4 |
| 4.69% | 1.6% | $ 831.25 | $ 7,753.35 | $3,983.41 | $1,818.37 | 5 |

TABLE 1B

Amount to Buy Down to Next Lowest Interest Rate

| Dropping interest rates | Percentage Δ Dealer Reserve | Cost of Buy Down Points |
|---|---|---|
| From rate of 7.19% dropped to 6.59% | 5.1% − 5.0% = 0.1% | requires 1 buy down point which costs $50.18 |
| From rate of 7.19% dropped to 6.19% | 5.1% − 4.4% = 0.7% | requires 2 buy down points which cost $353.42 |
| From rate of 7.19 dropped to 5.99% | 5.1% − 3.7% = 1.4% | requires 3 buy down points which cost $711.86 |
| From rate of 7.19% dropped to 5.19% | 5.1% − 2.8% = 2.3% | requires 4 buy down points which cost $1180.25 |
| From rate of 7.19 dropped to 4.69% | 5.1% − 1.6% = 3.5% | requires 5 buy down points which cost $1818.37 |

In Table 1A, "rate" is the rate that the lender will offer to the dealer's customers (i.e. the rates that the dealer will sell to the customer); percentage is the percentage of the loan amount that the lender will pay the dealer for doing the loan for them (expected profits); "dealer reserve" is this percentage converted into a dollar amount (i.e. dealer reserve=loan amount in dollars×percentage); "cost of borrowing" is the amount the customer would pay in total interest for the loan at each rate selected; "interest savings" is the amount the client will save from the highest interest rate of 7.19% to which ever rate they purchase; "cost of buy down points" is the dealer cost for buying the interest rate down to the rate. The number of buy down points available is the number of interest rates offered by the lender excluding the highest interest rate. Table 1B shows the dealer cost for the buy down points required to buy down the interest rate to each of the lower interest rates in the Tier 1 loan program from the initial rate of 7.19%. In the illustrated example, the dealer cost of the buy down points is calculated as the difference between the dealer reserve for the loan at the initial rate of 7.19% and the dealer reserve for the loan at the lower rate. Thus, selling the 2 buy down points at the dealer cost of $353.42 (to lower the interest rate to 6.19% for the customer) would recapture the lost dealer reserve, i.e. it would compensate the dealer for the loss in dealer reserve when selling the loan at the lower interest rate of 6.19% (with the sale of 2 buy down points), as compared to selling the loan at the higher interest rate of 7.19% (without selling any buy down points). In particular embodiments, the cost of any buy down points sold would be added to the total amount to finance, which affects the dealer reserve (since dealer reserve is based on the total amount to finance) for purposes of calculating the amount to recapture in lost dealer reserve.

As noted above, the dealer may either choose to sell the 2 buy down points at dealer cost (i.e. $353.42), or, similarly to other products, the dealer may price the buy down point at a mark-up in order to be able to make some additional profit from the sale of buy down points (e.g. mark up by $100 so the price for the 3 buy down points is $453.42).

Figure 9:
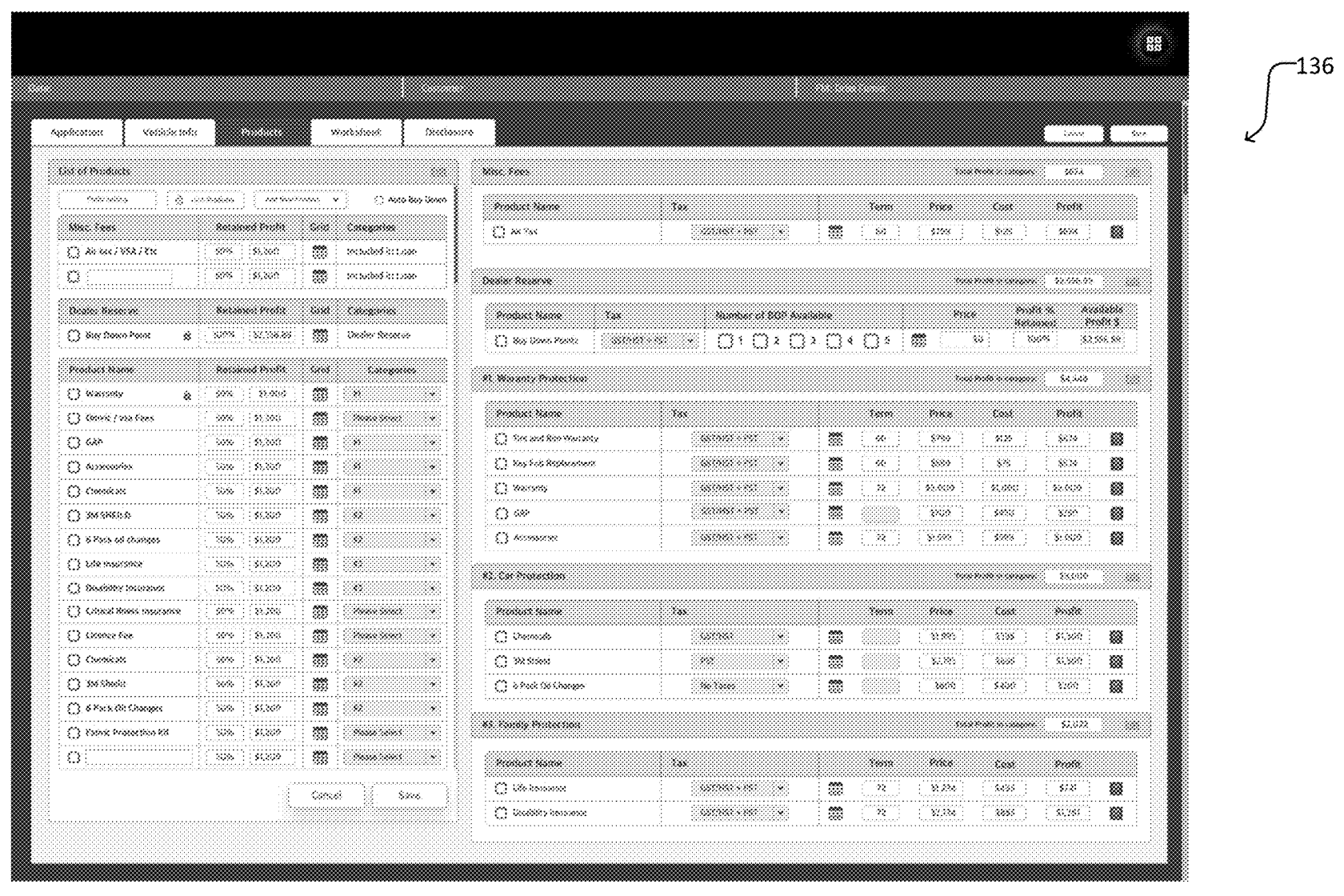

FIG. 9 is a screenshot of a graphical user interface for a product sheet 136 that can be used by a dealer to configure various options for products that can be offered to the buyer in a vehicle transaction. For example, the dealer can set a profit setting for each product, using the controls under the column labelled "Retained Profit". The dealer may choose to set the profit setting as a fixed expected dollar amount (e.g. $1,000 as shown in FIG. 9) or a certain percentage of the expected profits (e.g. 50% as shown in FIG. 9). The dealer can also use the graphical user interface to assign products to particular categories (e.g. warranty protection, car protection kit and family protection, as illustrated in FIG. 9). The dealer can set the profit settings for each category of product or for individual products.

Figure 10:
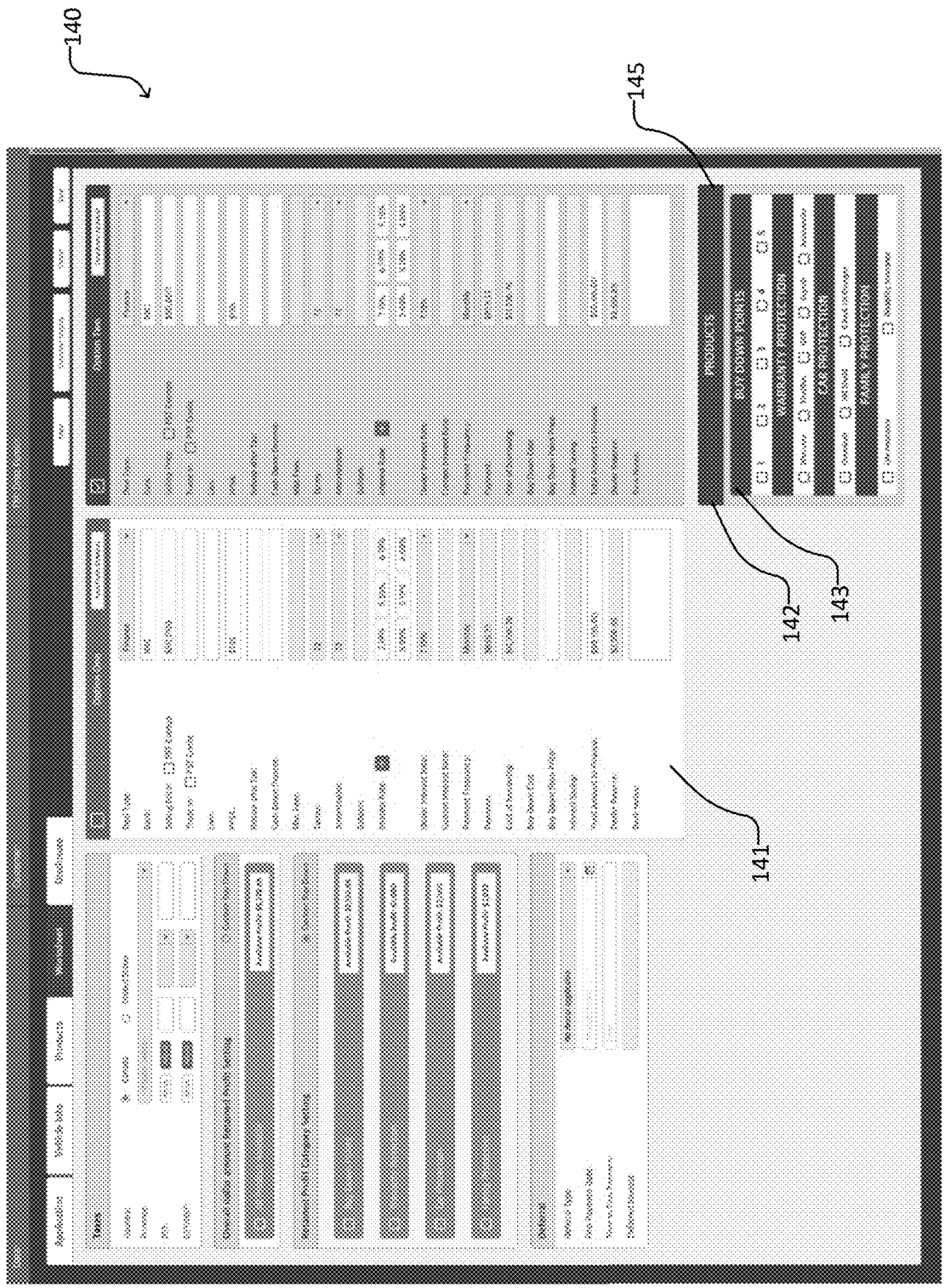
FIG. 10 illustrates a dealer worksheet that can be used by a dealer to configure financing plans for a vehicle purchase.

FIG. 10 is a screenshot of a graphical user interface for a dealer worksheet 140, wherein the dealer can configure a financing plan for a vehicle purchase requiring a loan amount of $50,135 ($50,000 for the vehicle plus $135 for the PPSA registration). The available interest rates given in this example are based on the rates given in the Tier 1 loan of Table 1 above. This worksheet shows an example plan 141 (Option One) that was approved by the lender. In the example plan that is illustrated, Option One does not include the purchase of buy down points or other products. In addition, the dealer has not activated any buy down. In the illustrated scenario, the plan 142 under Option Two is set up the same as the plan 141 under Option One. Both plans 141, 142 have a term of 72 months, interest rate of 7.19% and monthly payments of $859.33. Under the plan 142 of Option Two, a menu 145 is provided for the selection of various products, including a sub-menu 143 for buy down points; however, no buy down points are selected in the illustrated scenario. The dealer worksheet is preferably displayed to the dealer on a back end screen that is not shown to the buyer.

Figure 11:
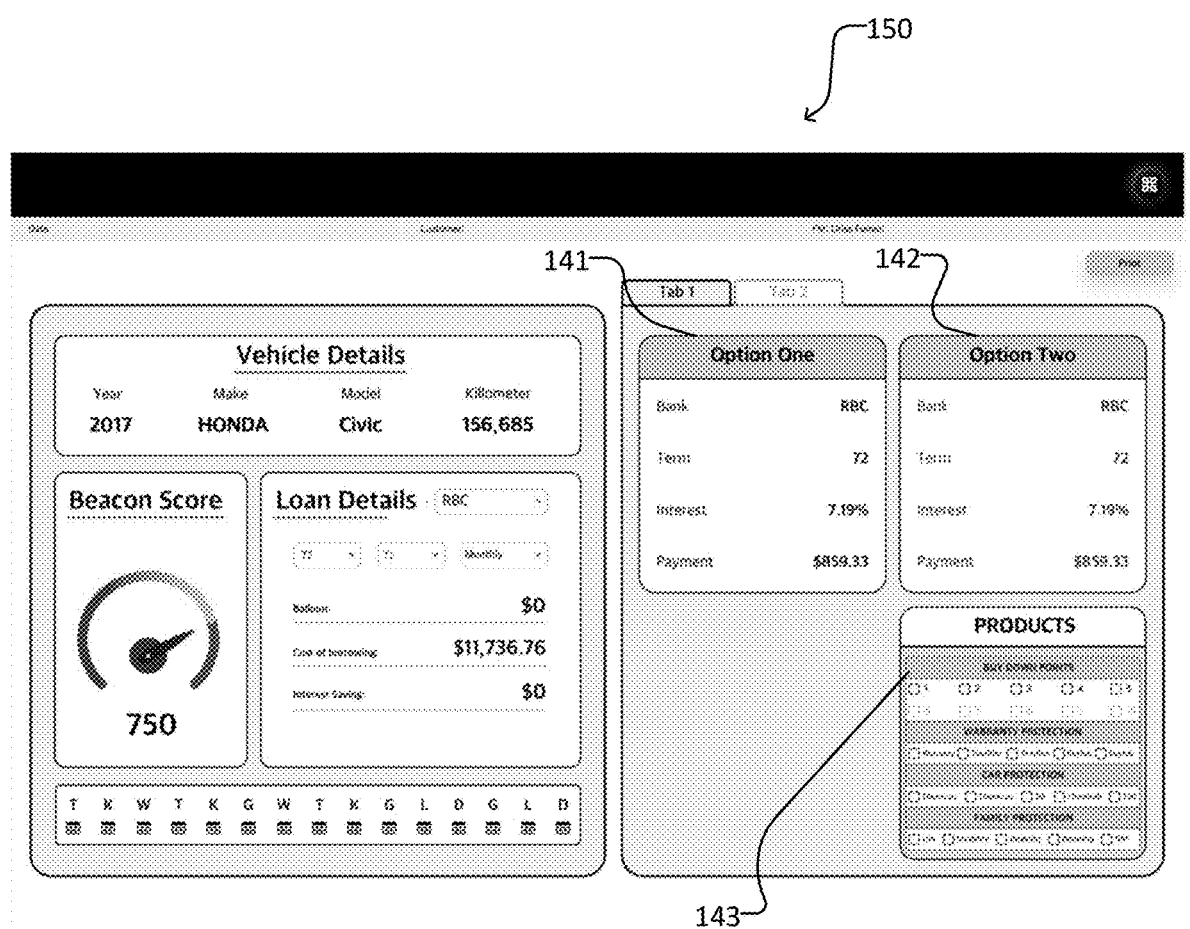
FIG. 11 illustrates a client-facing sheet shown to the buyer with the financing plans of FIG. 10.

FIG. 11 is a screenshot of the graphical user interface for a client-facing sheet 150 that would be shown to the buyer if the dealer set up the financing plans 141, 142 of FIG. 10. As seen in FIG. 11, the plans 141, 142 (under Option One and Option Two respectively) have the same term, interest rate and monthly payments. The client-facing sheet 150 displays only some of the information and controls that appear on the dealer back-end screen and worksheet 140 of FIG. 10, so that the buyer can focus on the information that is relevant to them (such as term, interest rate and monthly payments). In addition, the client-facing sheet 150 includes a product menu 145 under Option Two for the products to be included for the plan 142 of Option Two. In the illustrated scenario, no products have been selected.

Figure 12:
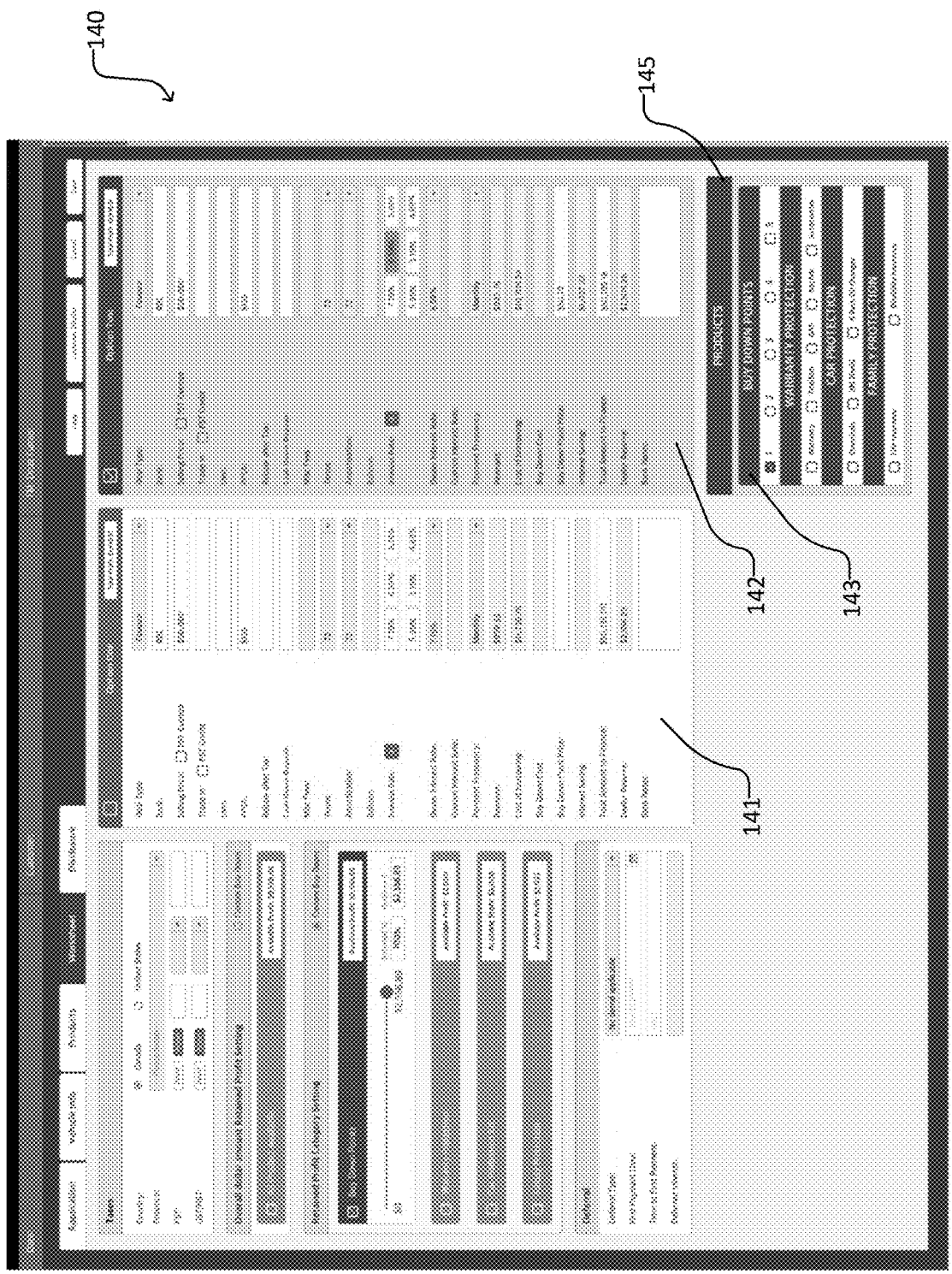
FIG. 12 illustrates a dealer worksheet that can be used by a dealer to configure a financing plan for a vehicle purchase including one buy down point.

The operation of the system to configure different financing plans using buy down points is now explained with reference to FIGS. 12 to 14. FIG. 12 shows the same dealer worksheet 140 of FIG. 10 used to configure a financing plan for a vehicle purchase requiring a loan amount of $50,135. However, in the worksheet of FIG. 12, the dealer has used the buy down sub-menu 143 under Option Two to select one buy down point. No other products have been selected. In the illustrated example, the purchase of the one buy down point causes the interest rate to drop to 6.59% (from the 7.19% for the plans of FIG. 10) for the plan 142 in Option Two. The dealer worksheet also shows that for Option Two the cost of the buy down point is $50.18 and the interest savings to the buyer is $1,038.96. Before the dealer presents financing plans 141, 142 to the buyer, the dealer can optionally use the worksheet to customize the profit setting for the buy down point. The profit setting sets the amount of profit that the dealer keeps from the transaction in plan 142 involving the buy down points; the remainder of the profit is used to buy down the interest rate and give the buyer greater interest savings.

Figure 13:
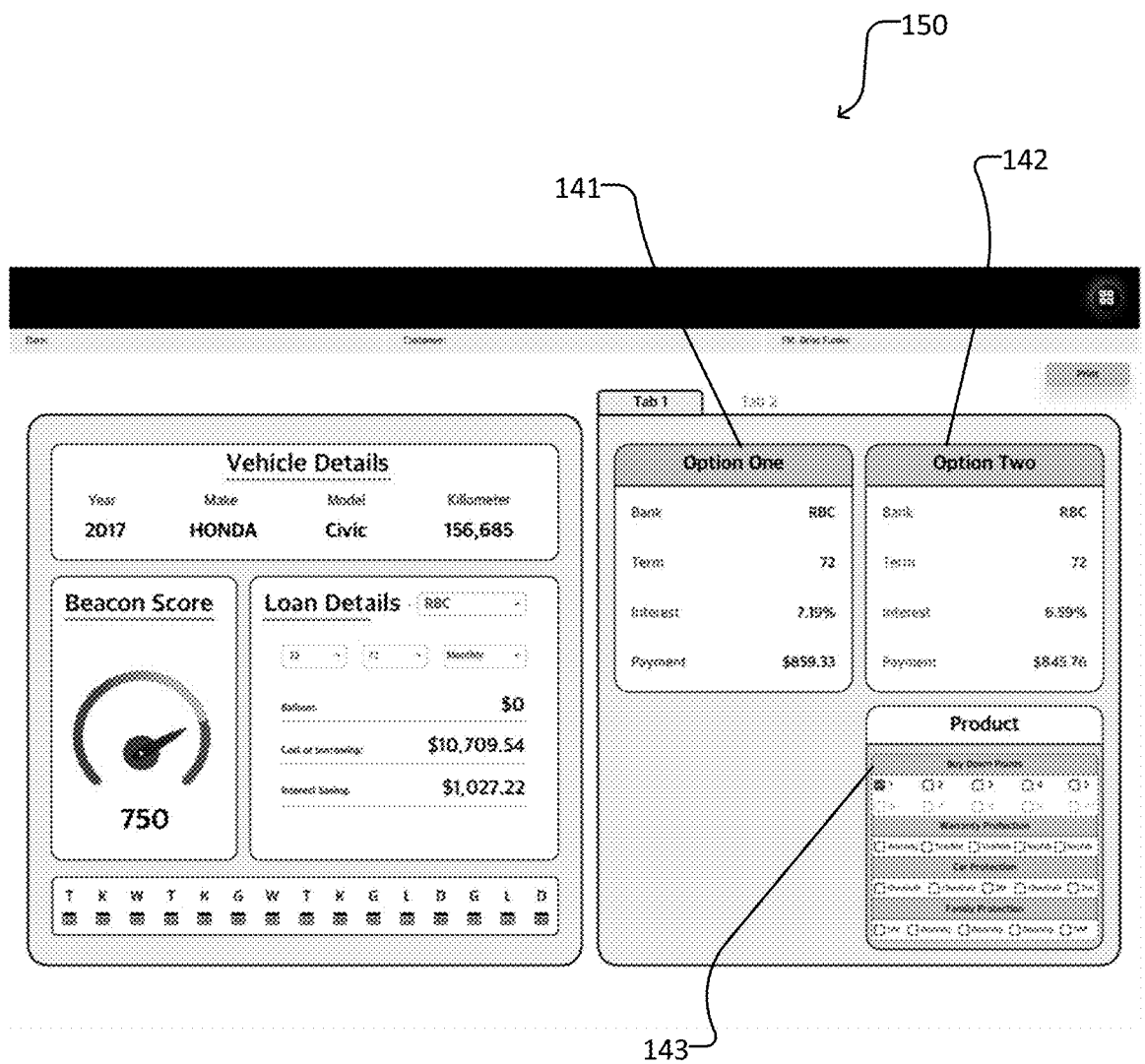
FIGS. 13 and 14 show tabs of a client-facing sheet displayed to the buyer, corresponding to the scenarios illustrated in FIG. 12.
Figure 14:
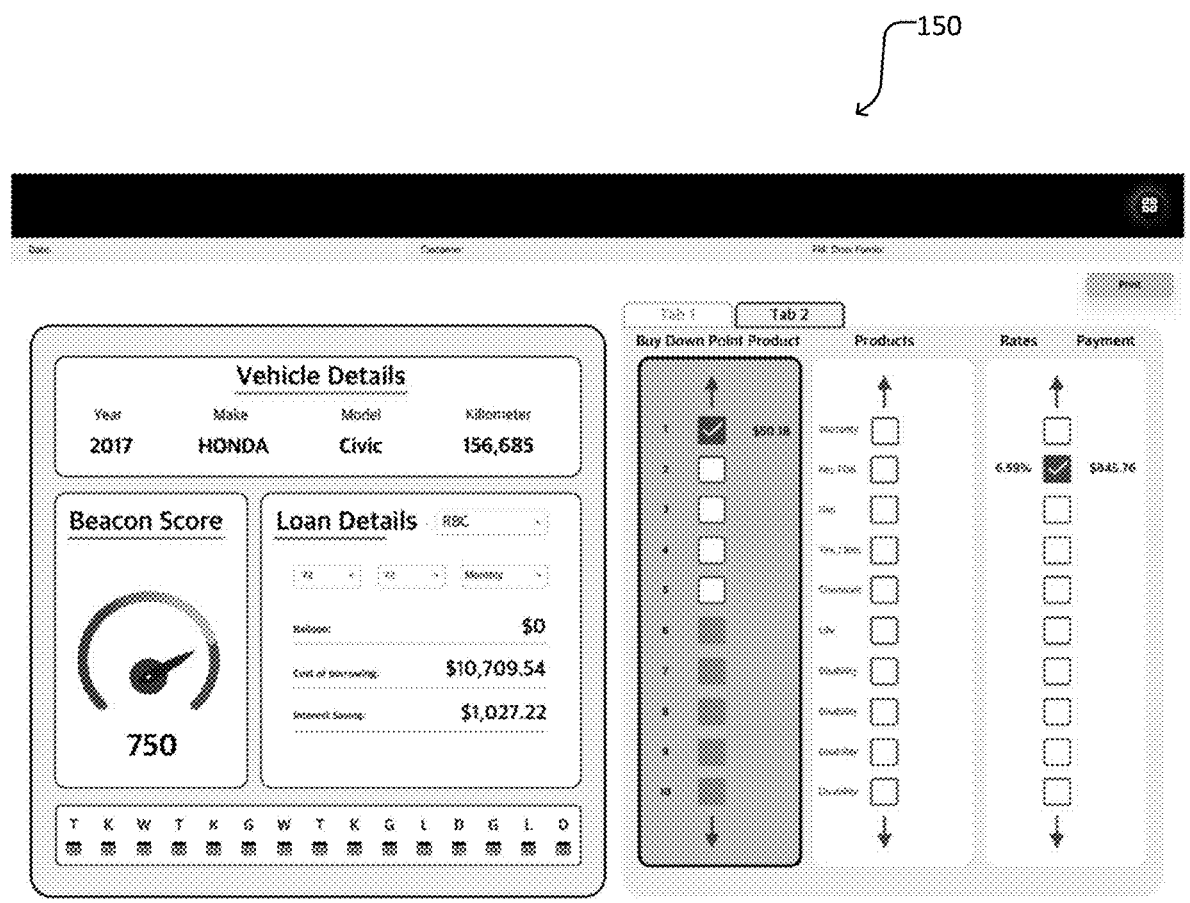

FIGS. 13 and 14 show Tab 1 and Tab 2, respectively, of the client-facing sheet 150 displayed to the buyer, corresponding to the scenarios illustrated in FIG. 12. Client-facing sheet 150 shows to the buyer that purchasing one buy point in the plan 142 of Option Two saves the buyer $1,038.96 in interest, and the new cost of borrowing is $10,709.54. In addition, for plan 142 of Option Two, the monthly payment is $845.76.

In Tab 2 (FIG. 14), the cost of the buy down point that is purchased is shown. In addition, the number of available buy down points for purchase is shown as selectable check boxes (1 through 5); the numbers that are not available (6 and up) are greyed out and are not selectable.

Figure 15:
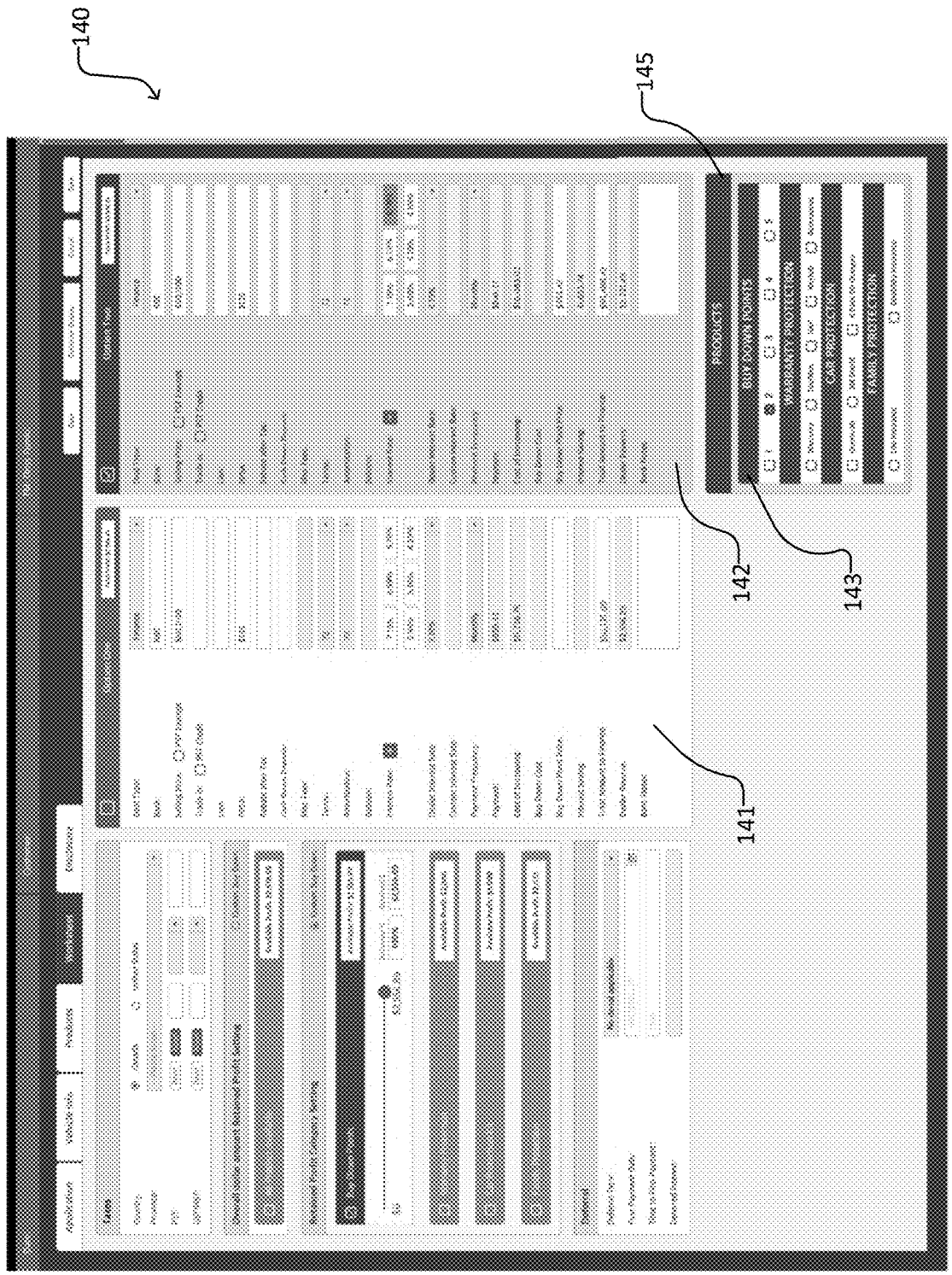
FIG. 15 illustrates a dealer worksheet that can be used by a dealer to configure a financing plan for a vehicle purchase including two buy down points.

FIG. 15 shows the same dealer worksheet 140 of FIG. 10 and FIG. 12 used to configure a financing plan for a vehicle purchase requiring a loan amount of $50,135. However, in the worksheet of FIG. 15, the dealer has used the buy down sub-menu 143 under Option Two to select two buy down points. No other products have been selected. In the illustrated example, the purchase of the two buy down points causes the interest rate to drop to 6.19% (from the 7.19% for the plans of FIG. 10) for the plan 142 in Option Two. The dealer worksheet also shows that for Option Two the cost of the two buy down points is $353.42 and the interest savings to the buyer is $1,653.74. Before the dealer presents financing plans 141, 142 to the buyer, the dealer can optionally use the worksheet to customize the profit setting for the buy down points. The profit setting sets the amount of profit that the dealer keeps from the transaction in plan 142 involving the buy down points; the remainder of the profit is used to buy down the interest rate and give the buyer greater interest savings.

Figure 16:
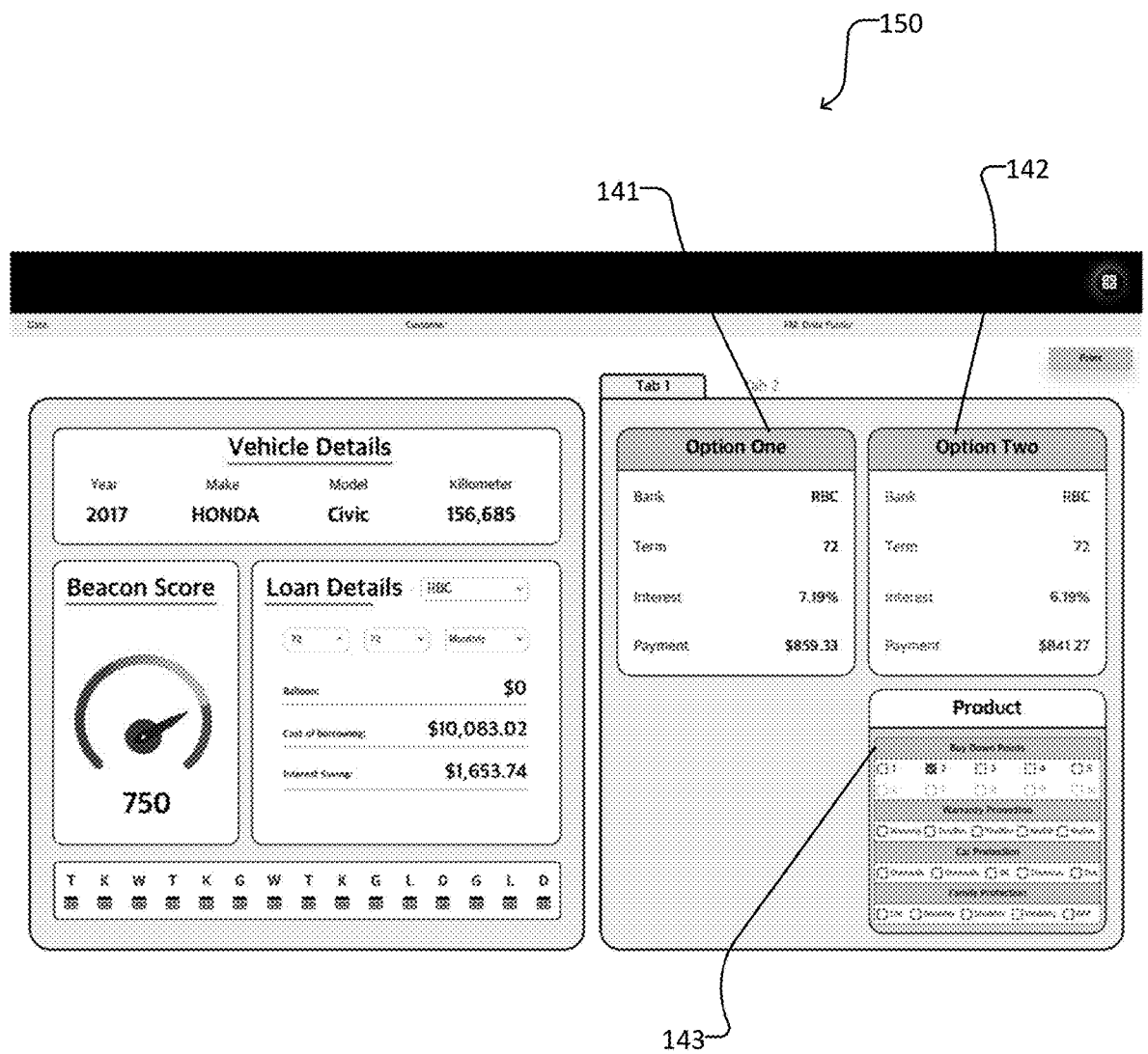
FIGS. 16 and 17 show tabs of a client-facing sheet displayed to the buyer, corresponding to the scenarios illustrated in FIG. 15.
Figure 17:
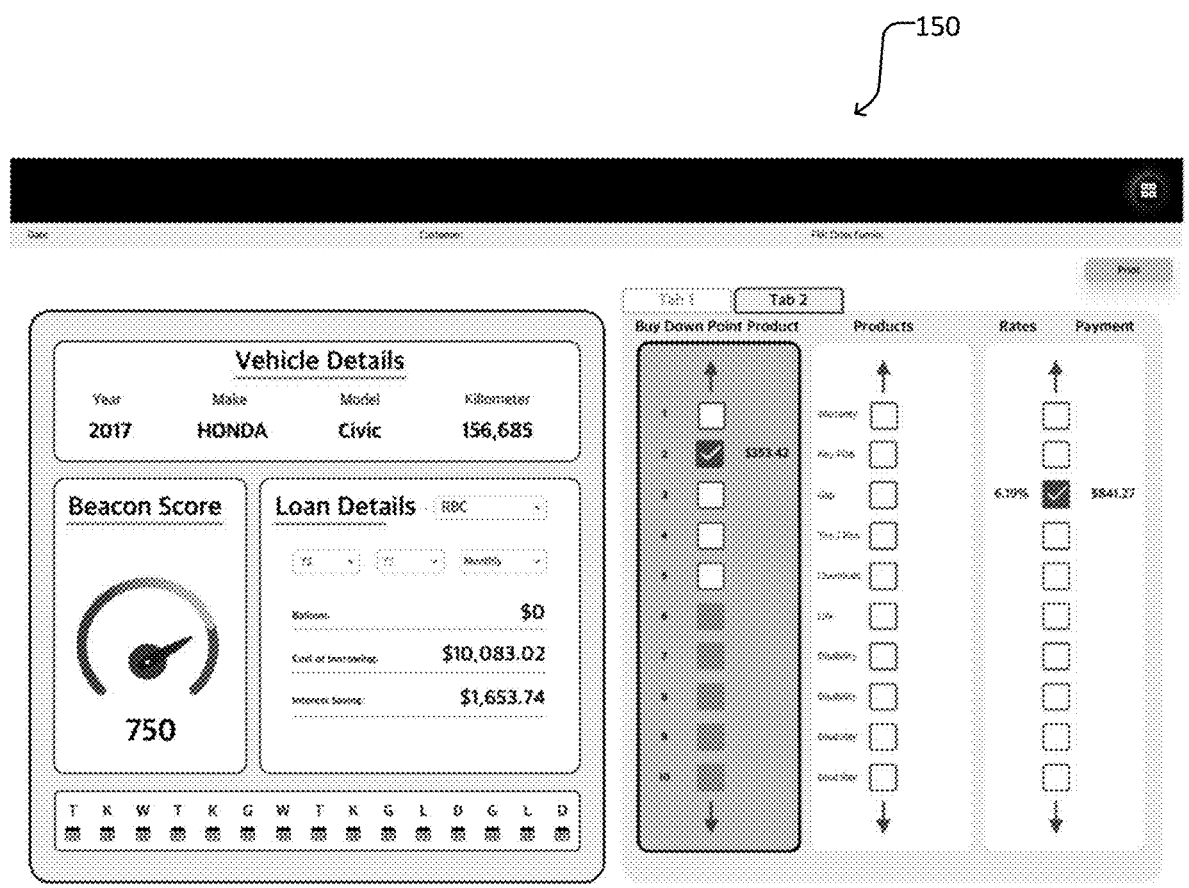

FIGS. 16 and 17 show Tab 1 and Tab 2, respectively, of the client-facing sheet 150 displayed to the buyer, corresponding to the scenarios illustrated in FIG. 15. Client-facing sheet 150 shows to the buyer that purchasing two buy points in the plan 142 of Option Two saves the buyer $1,653.74 in interest, and the new cost of borrowing is $10,083.02. In addition, for plan 142 of Option Two, the monthly payment is $841.27. In Tab 2 (FIG. 17), the cost of the buy down points that are purchased is shown.

The operation of the system to configure different financing plans using buy down points and other products is now explained with reference to FIGS. 18 and 19. As seen in the scenario illustrated in the dealer worksheet 140 of FIG. 18, plan 141 for Option One does not include the purchase of any products. However, plan 142 for Option Two includes the purchase of five buy down points (selected using buy down sub-menu 143) and a warranty (selected using warranty sub-menu 144). The dealer can use the worksheet 150 to set different profit settings for the buy down products and for the warranty products as shown. For example, in the illustrated scenario, the profit setting for the warranty products is set at 50% (retaining $1,000 in profit from the portion of the transaction involving the sale of the selected warranty). Alternately, the dealer can set an overall dollar amount for the retained profit for the transaction.

Figure 19:
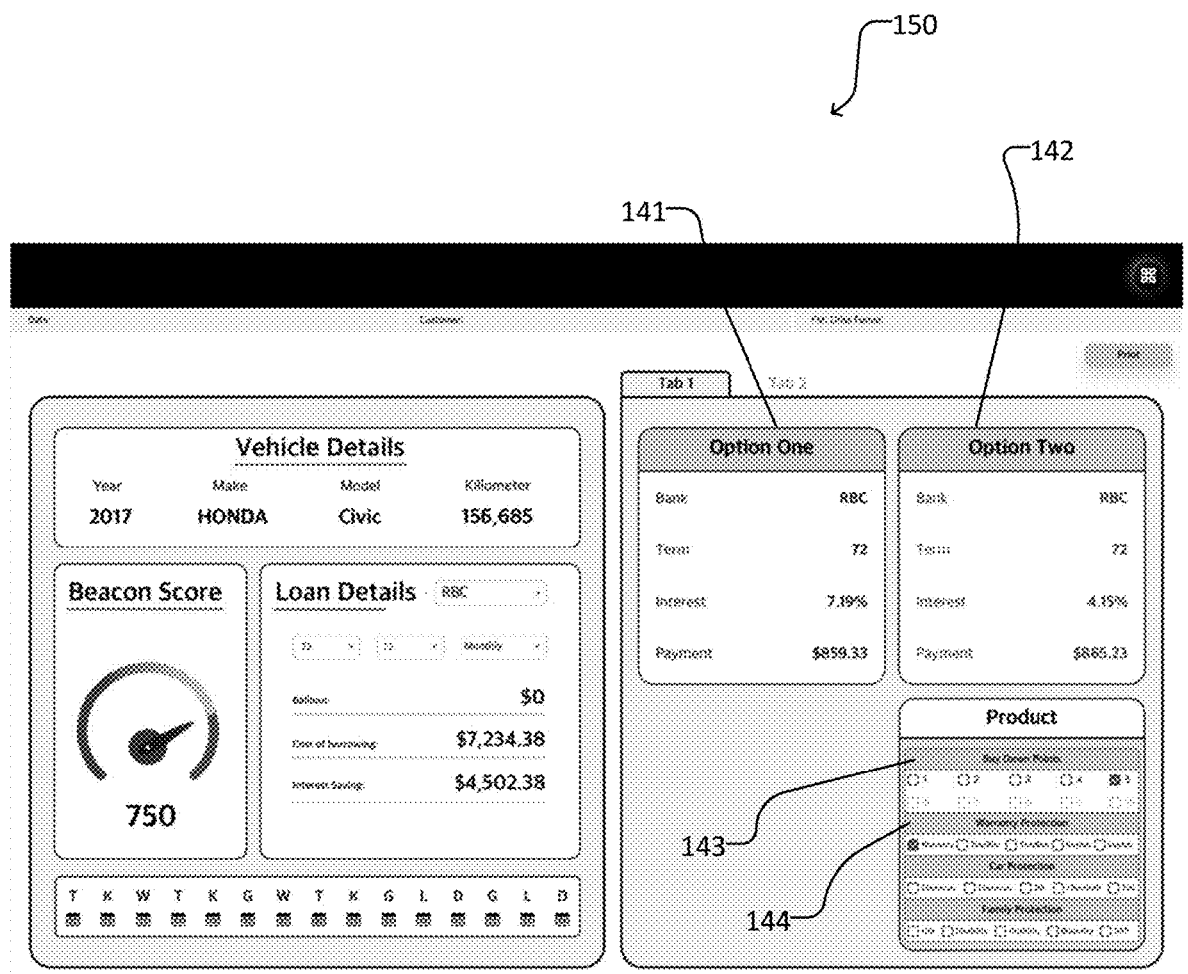
FIGS. 19 and 20 show tabs of a client-facing sheet displayed to the buyer, corresponding to the scenarios illustrated in FIG. 18.
Figure 20:
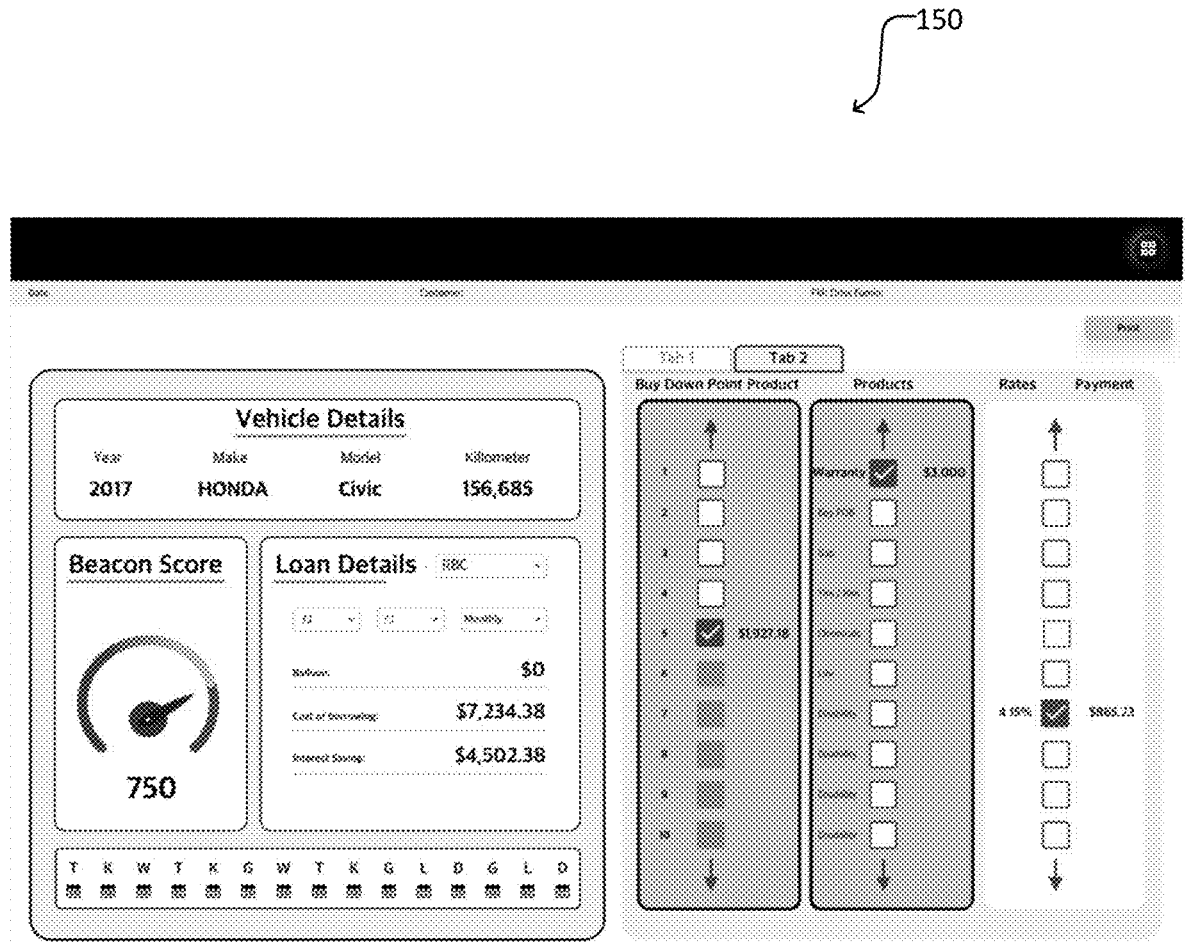

FIG. 19 shows Tab 1 of the client-facing sheet 150 displayed to the buyer, corresponding to the scenarios illustrated in FIG. 18. Client-facing sheet 150 shows to the buyer that purchasing five buy down points plus the warranty in plan 142 of Option Two saves the buyer $4,502.38 in interest, and the new cost of borrowing is $7,234.38. In addition, for plan 142 of Option Two, the interest rate has dropped to 4.15% from the 7.19% interest rate of plan 141 of Option One. FIG. 20 shows Tab 2 of the client-facing sheet 150 including the cost for purchasing the five buy down points and the warranty plan. As such, the buyer can see that by purchasing some products with the vehicle, the buyer can save on interest payments, and obtain some additional protection (e.g. the warranty). All of these advantages can motivate the buyer to enter into the transaction with the dealer.

Where a component (e.g. a server, client device, database, software module, processor, program memory, loan approval module, product options module, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which perform the function in the illustrated exemplary embodiments of the invention.

While a number of exemplary aspects and embodiments have been discussed above, those of skill in the art will recognize certain modifications, permutations, additions and sub-combinations thereof. It is therefore intended that the scope of the claims should not be limited by the preferred embodiments set forth in the examples, but should be given the broadest interpretation consistent with the description as a whole.

What is claimed is:

1. A computer implemented system for enabling a dealer to configure a plurality of financing plans for a vehicle purchase by a buyer, wherein the financing plans are provided by a lender associated with the dealer, the system comprising a transaction server having a computer processor configured to:

(a) determine a first plurality of financing terms including a first loan amount and a first interest rate for a first financing plan for the purchase of the vehicle without any other products and determine a first dealer reserve to be paid to the dealer by the lender for facilitating the first financing plan, and transmit the first plurality of financing terms to a dealer computing device for display to the dealer in a graphical user interface on the dealer computing device;

(b) accept, from the dealer computing device, a selection of one or more products to be purchased by the buyer with the vehicle, the one or more products comprising one or more aftermarket products and a service contract for the sale of one or more buy down points which provide the buyer with a second financing plan at a second interest rate which is less than the first interest rate;
(c) determine a second plurality of financing terms for the second financing plan including a second loan amount at the second interest rate and a second dealer reserve to be earned by the dealer for facilitating the second financing plan, wherein the second loan amount is greater than the first loan amount and wherein the service contract is priced to recapture at least some of the difference between the first dealer reserve and the second dealer reserve;
(d) transmit the second plurality of financing terms to the dealer computing device for display in the graphical user interface on the dealer computing device, wherein the graphical user interface on the dealer computing device is configured to display the first and second financing plans to the buyer based on the selection of the products;
(e) determine expected profits for the dealer based on the second financing plan including the sale of the selected one or more products;
(f) transmit, to an administrative computing device associated with an administrative user of the dealer, for display to the administrative user in a graphical user interface on the administrative computing device, the determined expected profits; and
(g) receive, from the administrative computing device, a selection of a profit setting based on the determined expected profits, wherein the profit setting represents a portion of the determined expected profits from the sale of the products and is used to generate a display window in the graphical user interface of the dealer computing device for the selection of the one or more products for sale to the buyer.

2. A system in accordance with claim 1 wherein the one or more aftermarket products comprise one or more of: warranty protection, car protection, and family protection.

3. A system in accordance with claim 1 wherein the transaction server is configured to accept a change in selection of the one or more buy down points, and in response to the change, the transaction server is configured to determine a new plurality of financing terms including a new interest rate based on the changed selection of the one or more buy down points, and transmit the new financing terms to the dealer computing device for display in the graphical user interface on the dealer computing device.

4. A system in accordance with claim 1 wherein the profit setting is represented in the graphical user interface on the administrative computing device as one or more of: a dollar amount and a percentage of the profit.

5. A system in accordance with claim 4 wherein a value for the profit setting is selected using a graphical control element in the graphical user interface on the administrative computing device.

6. A system in accordance with claim 5 wherein the graphical control element comprises a slider constrained to accept only values for the profit setting not exceeding a maximum profit from the purchase.

7. A system in accordance with claim 4 wherein a plurality of graphical control elements is displayed in the graphical user interface on the administrative computing device, each one of the plurality of graphical control elements corresponding to a variable profit setting for a category of products.

8. A computer-implemented method for enabling a dealer to configure a plurality of financing plans for a vehicle purchase by a buyer, wherein the financing plans are provided by a lender associated with the dealer, the method comprising:
(a) determining a first plurality of financing terms including a first loan amount and a first interest rate for a first financing plan for the purchase of the vehicle without any other products, determining a first dealer reserve to be paid to the dealer by the lender for facilitating the first financing plan, and transmitting the first plurality of financing terms to a dealer computing device for display to the dealer in a graphical user interface on the dealer computing device;
(b) accepting, from the dealer computing device, a selection of one or more products to be purchased by the buyer with the vehicle, the one or more products comprising one or more aftermarket products and a service contract for the sale of one or more buy down points which provide the buyer with a second financing plan at a second interest rate which is less than the first interest rate;
(c) determining a second plurality of financing terms for the second financing plan including a second loan amount at the second interest rate and a second dealer reserve to be earned by the dealer for facilitating the second financing plan, wherein the second loan amount is greater than the first loan amount, and wherein the service contract is priced to recapture at least some of a difference between the first dealer reserve and the second dealer reserve;
(d) transmitting the second plurality of financing terms to the dealer computing device for display in the graphical user interface on the dealer computing device, wherein the graphical user interface on the dealer computing device is configured to display the first and second financing plans to the buyer based on the selection of the products;
(e) determining expected profits for the dealer based on the second financing plan including the sale of the selected one or more products;
(f) transmitting, to an administrative computing device associated with an administrative user of the dealer, for display to the administrative user in a graphical user interface on the administrative computing device, the determined expected profits; and
(g) receiving, from the administrative computing device, a selection of a profit setting based on the determined expected profits, wherein the profit setting represents a portion of the determined expected profits from the sale of the products and is used to generate a display window in the graphical user interface of the dealer computing device for the selection of the one or more products for sale to the buyer.

9. A method in accordance with claim 8 wherein the one or more aftermarket products comprise one or more of: warranty protection, car protection, and family protection.

10. A method in accordance with claim 8 comprising accepting a change in selection of the one or more buy down points, and in response to the change, determining a new plurality of financing terms including a new interest rate based on the changed selection of the one or more buy down points, and transmitting the new financing terms to the dealer computing device for display in the graphical user interface on the dealer computing device.

11. A method in accordance with claim 8 comprising representing the profit setting in the graphical user interface on the administrative computing device as one or more of: a dollar amount and a percentage of the profit.

12. A method in accordance with claim 11 comprising providing a graphical control element in the graphical user interface on the administrative computing device to enable a value for the profit setting to be selected by the dealer.

13. A method in accordance with claim 12 comprising providing the graphical control element as a slider constrained to accept only values for the profit setting not exceeding a maximum profit from the purchase.

14. A method in accordance with claim 11 comprising displaying a plurality of graphical control elements in the graphical user interface on the administrative computing device, each one of the plurality of graphical control elements corresponding to a variable profit setting for a category of products.

\* \* \* \* \*